(12) United States Patent
Kurup et al.

(10) Patent No.: US 8,688,603 B1
(45) Date of Patent: Apr. 1, 2014

(54) SYSTEM AND METHOD FOR IDENTIFYING AND CORRECTING MARGINAL FALSE POSITIVES IN MACHINE LEARNING MODELS

(75) Inventors: Madhu M. Kurup, Bellevue, WA (US); Jeremy L. Calvert, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 302 days.

(21) Appl. No.: 13/296,209

(22) Filed: Nov. 14, 2011

(51) Int. Cl.
*G06F 15/18* (2006.01)
*G06N 3/00* (2006.01)
*G06N 3/12* (2006.01)

(52) U.S. Cl.
USPC .............................................. 706/13; 706/12

(58) Field of Classification Search
USPC ..................................................... 706/12–13
See application file for complete search history.

(56) References Cited

U.S. PATENT DOCUMENTS

| | | | | |
|---|---|---|---|---|
| 6,553,356 B1 * | 4/2003 | Good et al. | ...................... | 706/15 |
| 6,633,817 B1 * | 10/2003 | Walker et al. | .................... | 702/19 |
| 6,961,721 B2 * | 11/2005 | Chaudhuri et al. | ................... | 1/1 |
| 7,685,090 B2 * | 3/2010 | Chaudhuri et al. | .... | 707/999.001 |
| 7,702,772 B2 * | 4/2010 | Kurup et al. | ................... | 709/223 |
| 8,346,772 B2 * | 1/2013 | Bhattacharya et al. | ........ | 707/737 |
| 8,423,565 B2 * | 4/2013 | Redlich et al. | ................ | 707/758 |
| 8,429,110 B2 * | 4/2013 | Cai et al. | ......................... | 706/45 |
| 8,468,244 B2 * | 6/2013 | Redlich et al. | ................ | 709/225 |
| 8,527,475 B1 * | 9/2013 | Rammohan et al. | .......... | 707/692 |

* cited by examiner

*Primary Examiner* — Michael B Holmes
(74) *Attorney, Agent, or Firm* — Robert C. Kowert; Meyertons, Hood, Kivlin, Kowert & Goetzel, P.C.

(57) ABSTRACT

Embodiments of a system and method for identifying and correcting marginal false positives in machine learning models may include, based on reference data that includes pairs of information items and labels indicating whether pairs of information items have a specific relationship, generating a first machine learning model for determining whether pairs of information items have that relationship. Embodiments may include identifying one or more false positive pairs (e.g., a pair of information items that the first machine learning model indicates as having the specific relationship and which are labeled within the reference data as not having that relationship). Embodiments may include selecting identified false positive pairs as candidates for correction. Embodiments may include, subsequent to a correction of the reference data associated with the selected false positives, generating based on the corrected reference data a new machine learning model for determining whether pairs of information items have the specific relationship.

34 Claims, 15 Drawing Sheets

| Property | Item (ID: B000BZJ89S) | Item (ID: B000VASOFC) |
|---|---|---|
| Item name | Bosch 13860 Oxygen Sensor, OE Type Fitment | Bosch 13860 Oxygen Sensor |
| GTIN | 28851138604 | NA |
| Item Package Quantity | 1 | 1 |
| Manufacturer | Bosch | Bosch |
| Brand | Bosch | Bosch |
| Part number | 13860 | 13860 |
| Catalog number | 13860 | NA |
| Product type | Auto part | Auto accessory |
| Price per box | 77.54 | 122.72 |
| Product group | Automotive | Automotive |
| Item classification | Base product | Base product |
| Item type keyword | Automotive, oxygen, sensors | Automotive, accessories |
| Matching part number | 13860 | 13861 |
| Part type identifier | 5132 | 5132 |
| Product description | Bosch original equipment oxygen sensors are designed for identical OE fit, no cutting or wire splicing is necessary. Bosch invented the first oxygen sensor and has provided best in class performance and maximum service life so that they are the #1 OE and aftermarket sensor. Premium ceramic technology incorporates Zirconium or titania and yttrium provides superior protection against mechanical and thermal shock. | OE TYPE BEFORE CATALYST |

*FIG. 2*

| 302 | 304 |
|---|---|
| IPQ | Matching_direction: one-way<br>Matching_function: exact<br>Source_attribute: item_package_quantity<br>Target_attrbiute: item_package_quantity<br>Matching_threshold: 1.0<br>Accept_missing: no |
| image_id | NULL |
| part_number | NULL |
| gtin | Matching_direction: symmetric<br>Matching_function: exact<br>Source_attribute: gtin<br>Target_attrbiute: gtin<br>Matching_threshold: 1.0<br>Accept_missing: yes |
| title_1 | Matching_direction: one-way<br>Matching_function: exact<br>Source_attribute: alphabetic_item_name<br>Target_attrbiute: item_name<br>Matching_threshold: 0.95<br>Accept_missing: no |
| title_2 | Matching_direction: symmetric<br>Matching_function: fuzzy<br>Source_attribute: item_name<br>Target_attrbiute: item_name_and_product_description<br>Matching_threshold: 0.85<br>Accept_missing: no |

SYSTEM AND METHOD FOR IDENTIFYING AND CORRECTING MARGINAL FALSE POSITIVES IN MACHINE LEARNING MODELS

BACKGROUND

Merchants that operate network-accessible marketplaces may maintain electronic catalogs that include thousands of items (or more) offered for sale. These electronic catalogs often include item detail pages accessible through one or more networks (e.g., web pages accessible over the Internet). These item detail pages often include descriptive information (e.g., text descriptions, pictures or video) in order to assist a buyer in determining whether an item is worth purchasing. In many cases, this descriptive information may be based on information from manufacturers or suppliers of the items offered for sale. In some cases, different manufacturers and suppliers may provide the descriptive information to the merchant in different formats. For example, one supplier may list one type of identifier for an item as a part number whereas another supplier of that same item might list that identifier as a model number. In some cases, some suppliers may provide very detailed item information for an item whereas another supplier might provide very basic information. For instance, one supplier might include a text description including comprehensive marketing literature whereas another supplier might omit such description and only include basic information, such as a part or model number. Due at least in part to these types of variations in item information received from different suppliers of the same item, identifying duplicate item information and other relationships among item information may include a significant quantity of time and computing resources.

BRIEF DESCRIPTION OF THE DRAWINGS

FIG. 2 illustrates an example of item description information, according to some embodiments.

FIG. 3 illustrates an example population individual or duplicate detection rule, according to some embodiments.

Figure 1:
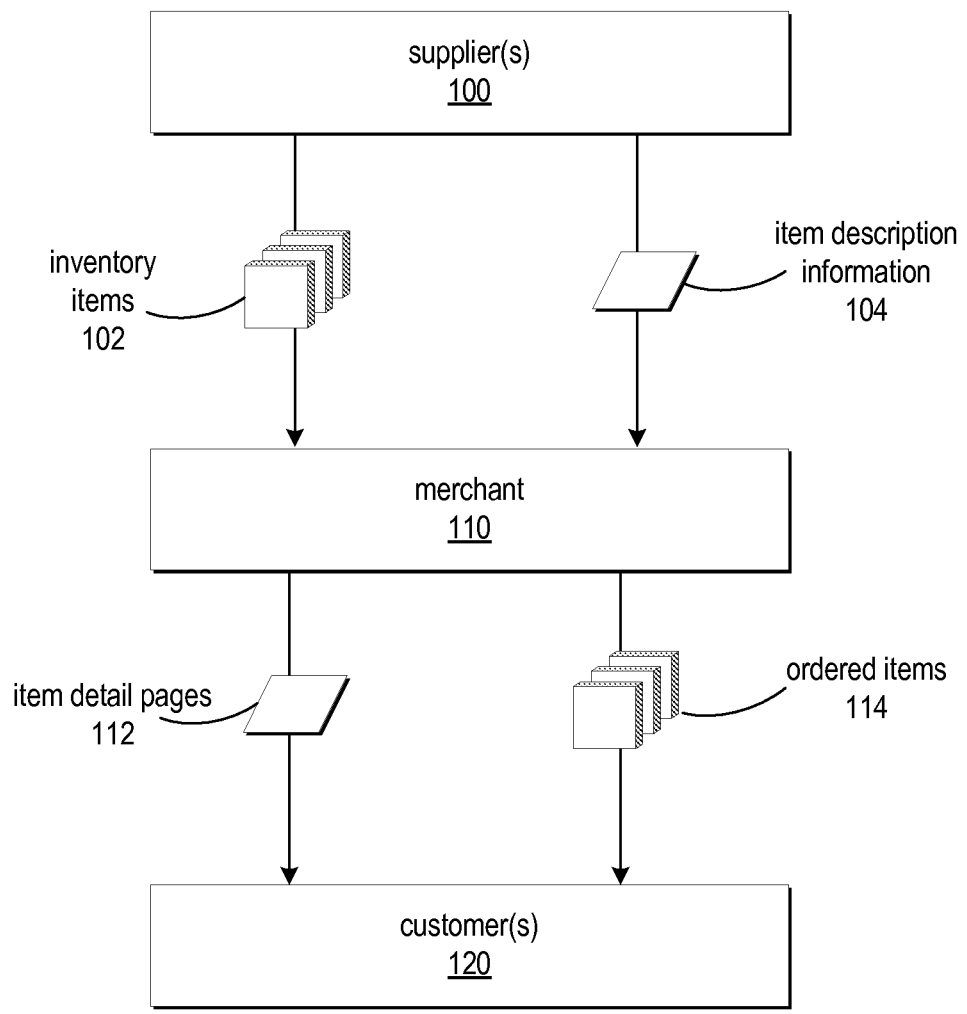
FIG. 1 illustrates a block diagram illustrating a merchant's acquisition and use of item description information, according to some embodiments.

While the system and method for identifying and correcting marginal false positives in machine learning models is described herein by way of example for several embodiments and illustrative drawings, those skilled in the art will recognize that the system and method for identifying and correcting marginal false positives in machine learning models is not limited to the embodiments or drawings described. It should be understood that the drawings and detailed description thereto are not intended to limit the system and method for identifying and correcting marginal false positives in machine learning models to the particular form disclosed, but on the contrary, the intention is to cover all modifications, equivalents and alternatives falling within the spirit and scope of the system and method for identifying and correcting marginal false positives in machine learning models as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for identifying and correcting marginal false positives in machine learning models are described. These machine learning models described herein may utilize any computer-implemented machine learning technique including but not limited to genetic algorithm (GA) techniques, boosted decision trees (BDTs), support vector machines (SVMs) and other machine learning techniques, whether presently known or developed in the future. In various embodiments, a machine learning model may generally include a collection of rules generated by these machine learning techniques, although such models are not limited to including such rules. For instance, as described in more detail below, duplicate detection rules may be generated for determining whether pairs of item description entries are duplicates (e.g., whether such entries described the same item), determining whether items are related (e.g., for advertising recommendation purposes), or determining whether items are unique.

Various embodiments may be configured to identify false positives within a given machine learning model. For instance, a false positive may be detected when a reference data set indicates that a pair of item description entries are not duplicates while a machine learning model (e.g., a GA rule set) indicates that such pair is a duplicate pair. In this example, the cause of the false positive may include, e.g., a deficiency of the model or a deficiency of the reference data set (e.g., a duplicate pair of item description entries mislabeled as a non-duplicate). Generally, the likelihood that the false positive is caused by a deficiency in the reference data set is directly related to the quantity of times a false positive is detected for a given pair of item description entries. For instance, consider a case where multiple generations of rules are created according to a GA analysis (such as the GA techniques described below). As a rule set evolves over time, item description pairs that were once identified as false positives may soon be correctly identified. However, there may be at least some pairs of item description entries that continue to be identified as false positives throughout most or all of the evolution of the rule set. These pairs of item description entries may be referred to as marginal false positives and are described in more detail below.

Various embodiments may utilize techniques for distinguishing marginal false positives from other false positives as well as correcting these marginal false positives within data sets that are used to train the machine learning models described herein, such as the reference data sets described in more detail below. In some cases, marginal false positives may be detected during or after generation of a particular machine learning model. The training data (e.g., the reference data described below) may be corrected in order to prevent the marginal false positives from reoccurring. After correction, that machine learning model may be regenerated based on the corrected training data in order to increase the performance of the model (e.g., as measured by precision and/or recall of the model). In many cases, an even larger performance boost may be realized by applying this technique to two different machine learning models. For instance, in some embodiments, marginal false positives may be detected with one type of machine learning model (e.g., a boosted decision tree), then the training data may be corrected to prevent at least some of those marginal false positives, and finally a second machine learning model (a rule-based GA model) may be generated based on the corrected training data. As different models may yield different sets or "views" of marginal false positives, using two different types of machine learning models in this way may identify and correct at least some marginal false positives that might otherwise go undetected. These techniques, including the elimination of a significant quantity of marginal false positives, may significantly improve the performance (e.g., precision and/or recall) of a given machine learning model in regard to duplicate detection and other objectives described herein.

Example Item Description Information

FIG. 1 illustrates a flow diagram of interactions between a merchant and its suppliers and customers. In the illustrated embodiments, merchant 110 may receive inventory items 102 from one or more suppliers. These suppliers may also provide item description information 104 to the merchant. For instance, the item description information may include details and characteristics (e.g., images, videos, text descriptions, specifications, part numbers, model numbers, manufacturer information and other information about an item) that may be used to construct item detail pages 112 viewed by customers; customers may order items 114 from the merchant based on information in the item detail pages. In various embodiments, the merchant may use the item description information as the basis for identifying an item received from a supplier. In many cases, the provided item description information may vary among different suppliers, even in cases where the item description information pertains to the same item. For example, the item description information may differ across suppliers for any of a variety of reasons including but not limited to differences in nomenclature or differences in the amount of detail that a merchant provides for a given item.

In various embodiments, item description information may be stored by the merchant as item description entries which may adhere to a structured or semi-structured format. For clarity of description, different item description entries that pertain to the same item may be referred to herein as duplicate item description entries. The machine learning models described herein may be configured to analyze item description entries in order to determine whether the item description entry for one item and the item description entry for another item are duplicates.

In some embodiments, the duplicate detection engine may be utilized to identify duplicate item description entries (e.g., entries that correspond to the same item offered for sale) such that the entries may be merged. For example, a merchant may rely on item description entries to generate item detail pages that are available to customers. For instance, item detail pages could be web pages available through a network-based marketplace and customers could browse such item detail pages from remote client devices equipped with web browsers. In this example, the presence of duplicate item description entries could result in the creation of two or more item detail pages for the same item. In some cases, it may be desirable to avoid this situation as it may provide a fragmented browsing experience for customers and may discourage price competition among third party sellers. By identifying and merging duplicate item description entries, embodiments may prevent the creation of two or more item detail pages for the same item. The situation above may be characterized as a false negative as the merchant failed to identify two items as duplicates when those items were actually duplicates. While this may fragment the browsing experience because two redundant item detail pages (e.g., web pages that offer the items for sale) may be created for the same item, it is unlikely to cause significant harm to the customer-merchant relationship. For instance, if a customer orders the item from either of the redundant web pages, the customer will still receive the item they expect to receive (e.g., the item they ordered). On the other hand, false positives may cause more harm to the customer-merchant relationship. Consider the case where a false positive in the merchant's classification scheme leads the merchant to believe that item A and item B are duplicates when in reality they are very different items. In this case, the merchant may mistakenly merge its representation of the two different items into a common representation, such as by merging the item detail pages and/or the inventory records of the two items. As such, a customer that orders item A might erroneously receive item B or vice versa. In the examples above, the customer-merchant relationship is more severely impacted in a negative manner by false positive misclassification of two non-duplicates as a duplicate.

Example Duplicate Item Description Entries

Embodiments may also include applying the new set of rules to one or more pairs of information items to identify at least one pair of information items as having the specific relationship. These information items may include the item description information described above, which may in some cases be structured as distinct item description entries for different items. In various embodiments, the rules described herein may be applied to identify pairs of information items that are duplicate pairs. For example, the rule sets generated with the techniques described herein may be utilized by a duplicate detection engine to detect duplicate item description entries within a data store of item description information. In some cases, duplicate item description entries may vary due to differences in the manner that suppliers (e.g., vendors, manufacturers, etc.) structure item description information. For instance, two different suppliers may provide units of the same item to a merchant. Each supplier may also provide item description information for the item in different formats. FIG. 2 illustrates one example of such information. In the illustrated embodiment, the item description information may include multiple different properties 200 for a particular item, such as various identifiers, characteristics, and descriptions. As illustrated, the item description information for the same item may vary across suppliers. For instance, item description information 202 may be provided by one supplier and item description information 204 may be provided by another supplier; this information may be different even though it pertains to the same item, namely a specific oxygen sensor in the illustrated example. The item description information may differ across suppliers for any of a variety of reasons including but not limited to differences in nomenclature. For example, one supplier may refer to an item identifier as a part number whereas another identifier may refer to that same identifier as a model number. In another example, suppliers may use different terms or phrases to describe the type of product that an item is. In the illustrated example, one supplier refers to the example oxygen sensor as being part of an "auto_part" product type and the other supplier refers to the sensor being part of an "auto_accessory" product type.

In various instances, if these types of differences are not recognized, the merchant or other entity that receives the item description information may interpret the information as pertaining to two different items even in cases where such information does indeed described the same item. For clarity of description, different item description entries that pertain to the same item may be referred to herein as duplicate item description entries or simply "duplicates." In the illustrated example, item description entries 202 and 204 represent duplicates. The presence of duplicates within a merchant's catalog may have a variety of implications including but not limited to the false negatives and false positives described above with respect to FIG. 1.

Example Rule

FIG. 3 illustrates an example of two item description entries that are duplicates. In the illustrated embodiment, the item description information may include multiple different attributes 200 (also referred to as properties) for a particular item, such as various identifiers, characteristics, and descriptions. As illustrated, the item description information for the same item may vary across suppliers. For instance, item description information 202 may be provided by one supplier and item description information 204 may be provided by another supplier; this information may be different even though it pertains to the same item, namely a specific oxygen sensor in the illustrated example. For example, in the illustrated example, one supplier refers to the example oxygen sensor as being part of an "Auto part" product type and the other supplier refers to the sensor being part of an "Auto accessory" product type. In any case, the two item description entries contain rich data and the duplicate detection engine described herein may identify these entries as duplicates based on such data.

Example Rule and Rule Conditions

In various embodiments, to reduce or eliminate the presence of duplicate item description entries, merchants (or other entities) may utilize a rule-based duplicate detection system to identify and/or merge such duplicates into single entries. As described in more detail below, the duplicate detection system may include a duplicate detection engine configured to use a rule set to evaluate multiple item description entries and identify and/or merge duplicate entries. In various embodiments, such a rule set may include multiple rules, each of which may include multiple rule conditions. FIG. 3 illustrates one such example rule. In the illustrated embodiment, rule 300 includes multiple rule conditions 302, each of which may include one or more elements 304. For instance, the first rule condition of the illustrated rule pertains to item package quantity or "IPQ." Additionally, the IPQ rule condition includes multiple parameters that generally specify how a portion of one item description entry should be compared to another item description entry for duplicate detection. For the illustrated IPQ rule condition, the condition parameters specify that one-way evaluation of the source attribute and the target attribute is sufficient. In this case, the source attribute is the "item_package_quality" attribute of the first item description entry and the target attribute is the "item_package_quality" attribute of the second item description entry. As illustrated, a rule condition may also designate a particular matching function with which to compare the attributes. Also illustrated, the condition may specify a matching threshold score that should be met in order for the rule condition to be met. In the IPQ rule condition, this threshold score is 1.0. In other words, the "exact" matching function must at a minimum return a score of 1.0 in order for the IPQ rule condition to resolve to true for the pair of item description information entries being evaluated.

In the illustrated embodiment, a number of other rule conditions are illustrated (e.g., "gtin," "title_1" and "title_2"). In some cases, other available rule conditions may not be used for this particular rule. As illustrated, these rule conditions are marked "null" for rule 200. In various embodiments, various other rule conditions for evaluating pairs of item description entries may be utilized. For instance, rule conditions that are not illustrated and/or variations of the illustrated rule conditions may be utilized. Furthermore, while not illustrated in the particular example rule of FIG. 3, the rule conditions of a given rule may be associated by one or more Boolean logic operators (e.g., AND, OR, etc.). For instance, the "AND" Boolean operator may be utilized to specify that in order for one item description entry to be considered a duplicate of another item description entry, all rule conditions of the rule must be met. Rules themselves may also be linked or associated with other rules through similar Boolean logic operators.

As noted above, in various embodiments multiple rules may be aggregated together as part of one or more rule sets, which may be interpreted and utilized by a duplicate detection engine in order to identify and/or merge item description entries. In various embodiments, the rule set(s) may be generated utilizing genetic techniques, as described in more detail below. Generally, when compared to administrator-generated rule sets, the use of genetic techniques may result in faster creation of a given rule and/or a rule set that yields better recall and precision.

Machine Learning Techniques for Creation of a Rule Set

Figure 4:
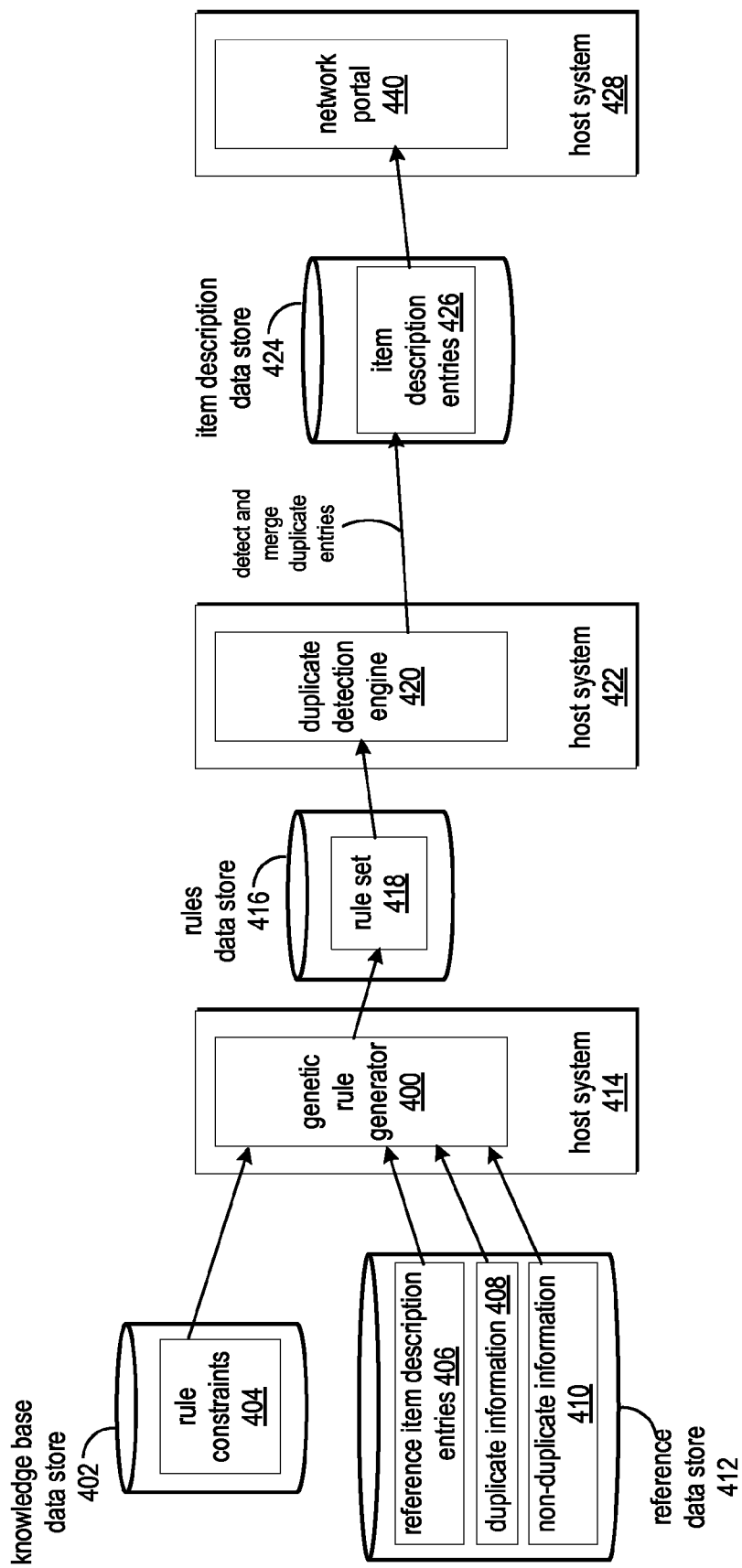
FIG. 4 illustrates a block diagram of the elements of a system and method for identifying and correcting marginal false positives in machine learning models, according to some embodiments.
Figure 5:
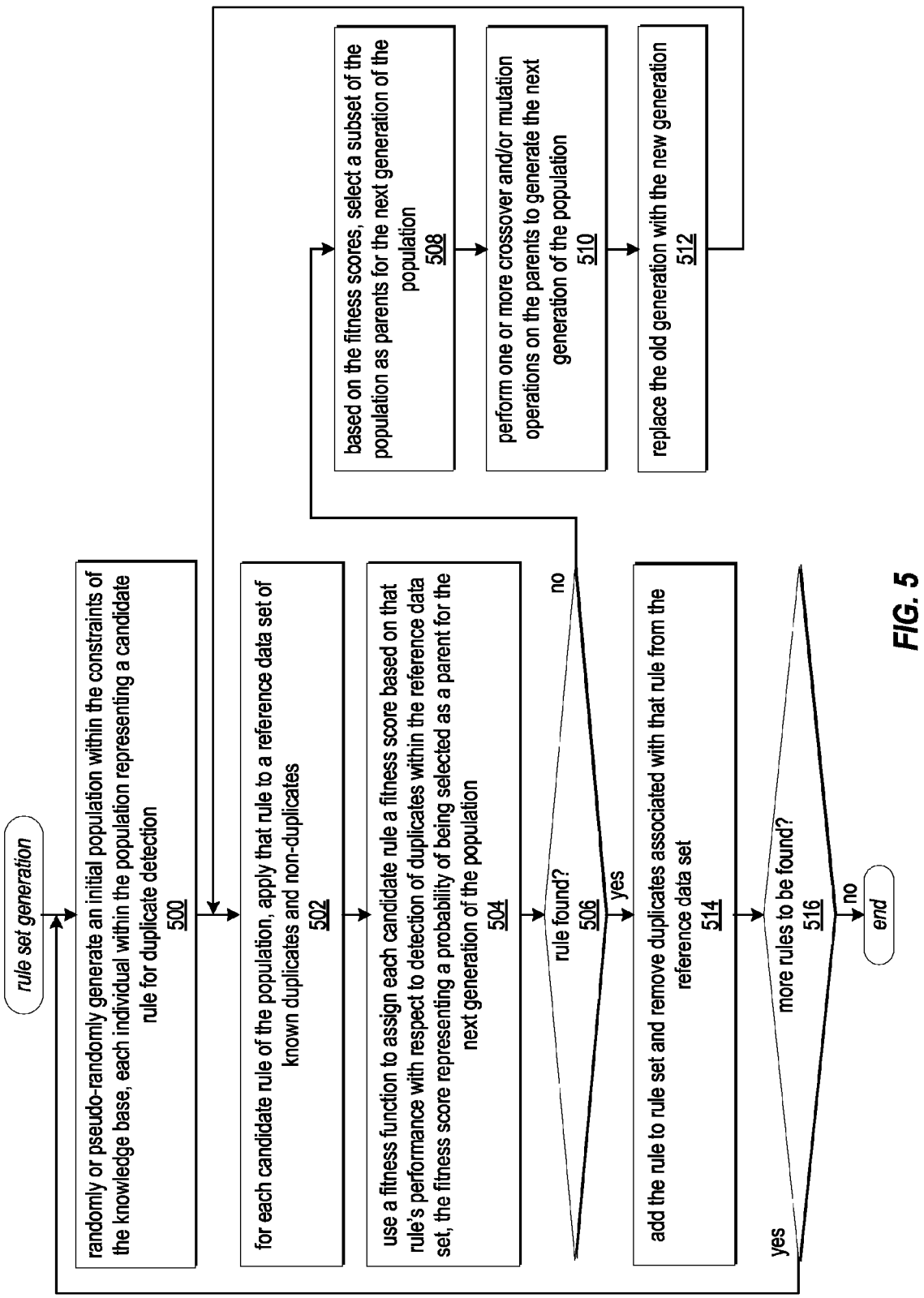
FIG. 5 illustrates a flowchart of an example method for using genetic techniques to generate a rule set for duplicate detection, according to some embodiments.

In various embodiments, the genetic creation of a rule set may be performed by a genetic rule generator component. FIG. 4 illustrates a system configuration including a genetic rule generator, according to some embodiments. In various embodiments, genetic rule generator 400 may be configured to utilize genetic techniques and/or genetic algorithms to generate rule set 418 of rules data store 416. In various embodiments, genetic rule generator 400 may be implemented on a host system 414. In various embodiments, host system 414 may be a computer, such as the computer system of FIG. 10 described below. In various embodiments, genetic rule generator 400 may be configured to generate rule set 418 according to a method for genetic rule creation, such as that of FIG. 5. For clarity of description, FIGS. 4 and 5 are described collectively herein. Furthermore, note that while the method of FIG. 5 is described herein as being performed by genetic rule generator 400, the method need not be performed by any specific component in some cases. For instance, in some cases, the method of FIG. 5 may be performed by some other component or computer system, according to some embodiments. In various embodiments, the method of FIG. 5 may be performed by a computer, such as the computer system of FIG. 10.

As illustrated at block 500, the method may include genetic rule generator 400 randomly or pseudo-randomly generating an initial population of rules within the constraints of a knowledge base. In various embodiments, each individual within the population may be a candidate rule for detecting duplicate item description entries (e.g., different item description entries for the same item). One example of such constraints includes rule constraints 404 of knowledge base data store 402. Generally, rule constraints 404 may include any constraint on the manner in which candidate rules are generated. For instance, in some embodiments, a given constraint may place restrictions on which fields of a pair of item description entries may be compared. This may prevent the genetic rule generator 400 from needlessly wasting computation resources on rules that are likely to provide inferior results. For instance, one example constraint might specify that the "color" field from one item description entry cannot be compared to a "size" field of another item description entry. For example, even though item description information may vary across suppliers, suppliers are unlikely to specify an item's color within a size field and vice versa. However, other variabilities may occur across merchant data. For instance, as described above, one supplier may refer to an item identifier as a part number whereas another identifier may refer to that same identifier as a model number. As described in more detail below, the rules described herein may be genetically adapted or evolved to identify similarities among this type of semi-structured item description information.

Figure 6:
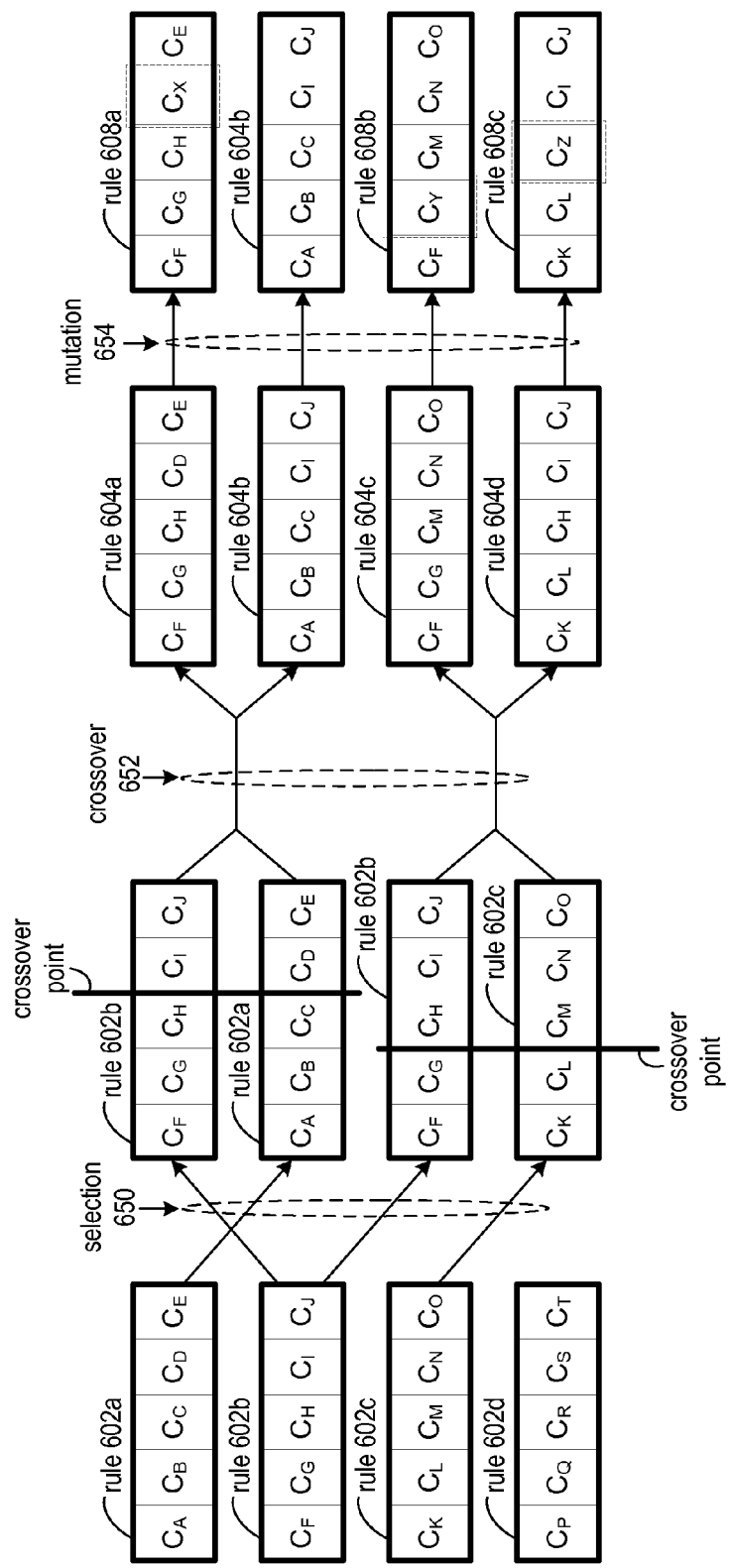
FIG. 6 illustrates a block diagram of performing selection, crossover, and mutation on candidate rules that include multiple different conditions, according to some embodiments.

In various embodiments, to randomly or pseudo-randomly generate a given rule within the initial population, the method may include the genetic rule generator randomly selecting rule conditions from a set of possible rule conditions within the constraints set forth by constraints 404. For instance, example rule conditions are described above with respect to rule conditions 304. In various embodiments, the quantity of rule conditions in a given rule may also be generated randomly or pseudo-randomly. Likewise, relationships (e.g., Boolean relationships) between the rule conditions of a given rule may also be randomly or pseudo-randomly generated in some embodiments. FIG. 6, which is also collectively described herein along with FIGS. 4 and 5, illustrates a non-limiting example initial population of candidate rules 602a-d. In this non-limiting example, the initial population of rules consists of four rules; however, in various embodiments any quantity of rules (e.g., more than four) may be generated as part of the initial population. In the illustrated embodiment of FIG. 6, conditions $C_A$-$C_E$ represent five randomly or pseudo-randomly selected conditions that make up rule 602a. Likewise, conditions $C_F$-$C_J$ represent five randomly or pseudo-randomly selected conditions that make up rule 602b, conditions $C_K$-$C_O$ represent five randomly or pseudo-randomly selected conditions that make up rule 602c, and conditions $C_P$-$C_T$ represent five randomly or pseudo-randomly selected conditions that make up rule 602d. In various embodiments, each rule condition of FIG. 6 may be similar to any of the rule conditions described herein. For instance, rule conditions may be similar to rule conditions 304 of FIG. 3 described above.

As illustrated at block 502, the method may include the genetic rule generator, for each candidate rule of the population, applying that rule to a reference data set of known duplicates and non-duplicates. One example of this reference data set includes reference item description entries 406 of reference data store 410. In various embodiments, duplicate information 408 may indicate which pairs of item description entries (from entries 406) are duplicates (e.g., entries that may be different across one or more fields but nevertheless describe the same item, such as entries 202 and 204 of FIG. 2). In various embodiments, non-duplicate information 410 may indicate which pairs of item description entries (from entries 406) are not duplicates. In various embodiments, the duplicate and non-duplicate information may be determined prior to the genetic analysis. For instance, a system administrator or operator may evaluate reference item description entries 406 to definitely determine which pairs of items are duplicates and not duplicates as well as store such information within reference data store 412. In various embodiments, reference item description entries may be a sample taken from item description entries 426, which may represent a larger group of item description entries. For instance item description entries 426 may represent the item description entries for an entire electronic catalog of items or some portion thereof (e.g., a portion pertaining to a product category, such as automotive or lawn and garden).

As illustrated at block 504, the method may include the genetic rule generator using a fitness function to assign each candidate rule a fitness score based on that rule's performance with respect to detection of duplicates within the reference data set (e.g., within reference item description entries 406). In various embodiments, the fitness score for a given candidate rule may represent that candidate rule's probability of being selected as a parent for the next generation of the population. In this way, candidate rules with relatively large fitness scores will be more likely to become parents and fitness scores with relatively small fitness scores will be less likely to become parents. In various embodiments, the genetic rule generator 400 may determine measures of precision and recall for each candidate rule in the population and generate a corresponding score using a fitness function that is based at least in part on measures of precision and recall. One example fitness function may be $$\text{fitness score} = \text{recall} \times .999^{NR} \times 0.9999^{NT} + \beta.$$

In various embodiments, this fitness function may be utilized when the precision of a candidate rule is 100% (or some other configurable threshold). Also note that recall of the fitness score may be a positive value. Furthermore, NR may represent the number of non-null rule conditions. For instance, as the number of non-null rule conditions increases, the fitness score above will decrease. In this example, the larger the quantity of non-null rule conditions, the smaller the probability that the respective rule will be selected as a parent for the next generation of candidate rules. In other words, candidate rules are penalized for having large quantities of non-null rule conditions in some cases. Furthermore, NT may represent the number of tokens (e.g., parsed terms or phrases)

within one or more conditions of the candidate rule being evaluated. In this way, candidate rules may be penalized for having verbose rule conditions in some cases (e.g., simpler rules may be favored in some embodiments). In various embodiments, if precision is below 100% (or some other configurable threshold), the fitness score may be set to $\beta$. In this way, candidate rules may be penalized for having poor precision. In some embodiments, $\beta$ may be some small positive value (e.g., 0.02). In this way, in some embodiments, even candidate rules that do not exhibit strong fitness scores have at least some chance of being selected as a parent for the next generation of rules. While the number of rule conditions and the quantity of tokens are provided as examples of factors that influence the fitness scores described herein, the fitness scores may in various embodiments utilize any measure of rule complexity and/or expressiveness to generate a fitness score. Generally, these measures may provide some indication of the computing resources required to evaluate the rules; computationally simple rules may in some embodiments be preferred over more complex rules.

After block 504, the method may proceed to block 506, at which point the genetic rule generator may determine whether a rule has been found. In various embodiments, this may include comparing a measure of recall for the current generation of candidate rules to a measure of recall for the previous generation of candidate rules. (This aspect of the method may be skipped for the initial population.) For instance, in some cases, this measure of recall may include average recall for each candidate rule in the populations. In other cases, this measure of recall may include a measure of recall for the best rule (e.g., the rule with the largest recall) of each population. In various embodiments, if the measure of recall has not improved by a certain quantity relative to the last generation (e.g., has not increased by a configurable percentage) and/or has not increased within a certain number of iterations, the method may include genetic rule generator 300 determining that a rule has been found. In cases where the measure of recall is not improving (e.g., has not improved beyond some configurable threshold of recall improvement) at block 506, the genetic rule generator may determine that a rule has been found, and the method may proceed to block 514 (described in more detail below). In cases where the measure of recall is still improving (e.g., improved beyond some configurable threshold of recall improvement) at block 506, the method may proceed to block 508.

As illustrated at block 508, the method may in various embodiments include the genetic rule generator 400 selecting a subset of the population of candidate rules as parents for the next generation of the population based on the fitness scores that were generated for the candidate rules of the initial population. As noted above, the fitness score for a given candidate rule may represent that candidate rule's probability of being selected as a parent for the next generation of the population. Generally, candidate rules with larger fitness scores will be more likely to be selected than candidate rules with relatively smaller fitness scores. In some embodiments, a specific quantity of rules may be selected for inclusion within the subset of parents. In other cases, the subset may be selected such that a particular ratio or percentage of the candidate population is selected as parents. In various embodiments, the candidate rules may be weighted within a selection pool based on their respective fitness scores and the method may include the genetic rule generator randomly or pseudo-randomly selecting candidate rules from such selection pool. In some cases, some other type of probabilistic selection may be performed such that the probability of selecting a given candidate rule to be a parent is proportional to that candidate rule's fitness score. In any case, the selected subset of candidate rules may be designated as parents that are to be used to reproduce the next generation of candidate rules. In the illustrated embodiment, this selection process is illustrated as selection 650. For instance, in the illustrated embodiment of FIG. 6, rule 602d may have a very small fitness score relative to the fitness scores generated for rules 602a-c. In this case, rules 602a-c are probabilistically selected to become parents and rule 602d is eliminated from consideration.

As illustrated at block 510, the method may include the genetic rule generator 400 performing one or more crossover and/or mutation operations on the parents to generate the next generation of the population. For instance, examples of crossover and mutation operations are illustrated as crossover 652 and mutation 654 of FIG. 6. In various embodiments, a mutation operation may include selecting a crossover point for a pair of candidate rules and, on one side of the crossover point, swapping the conditions of each rule. For instance, in the illustrated example, a crossover operation is performed on rule 602a (including conditions $C_A$-$C_E$) and rule 602b (including conditions $C_F$-$C_J$) in order to generate rule 604a (including conditions $C_F$-$C_H$ and $C_D$-$C_E$) and rule 604b (including conditions $C_A$-$C_C$ and $C_I$-$C_J$. A similar crossover may be performed to generate rules 604c and 604d from rules 602b and 602c. As illustrated, the crossover operations may create a new generation of rules that are comprised of the conditions from the previous generation of rules. In various embodiments, before the new generation of candidate rules is finalized, one or mutation operations 654 may also be performed on the conditions of the new generation. In various embodiments, these conditions may be selected randomly or pseudo-randomly. In the illustrated embodiment of FIG. 6, conditions $C_D$, $C_G$, and $C_H$ are randomly selected for mutation. As illustrated, these conditions are mutated (e.g., modified) into new conditions $C_X$, $C_Y$, and $C_Z$. In various embodiments, the mutation operation may include but is not limited to adding a random rule condition, removing a random rule condition, mutating a random element of a random rule condition (e.g., changing a one-way matching requirement to a symmetric matching requirement for an item name comparison), and/or replacing all rule conditions with new random rule conditions. As illustrated in FIG. 6, mutation operation(s) 654 may result in mutated rules 608a-c; rule 604b remains unchanged. In various embodiments the collection of mutated rules 608a-c and rule 604b may make up the new generation of candidate rules.

As illustrated at block 512, the method may include the genetic rule generator replacing the old generation of rules (e.g., rules 602a-d) with the new generation of rules (e.g., rules 608a-c and rule 604b). In various embodiments, this new generation may become the current generation that is evaluated. After block 512, the method may proceed to block 502, at which point another iteration begins for the current population.

As described above, in cases where the measure of recall is not improving (e.g., has not improved beyond some configurable threshold of recall improvement) at block 506, the genetic rule generator may determine that a rule has been found, and the method may proceed to block 514. For instance, rules may be found when recall plateaus or levels off after some quantity of iterations. In various embodiments, the rule identified by the genetic rule generator may be strongest rule of the population (e.g., the rule with the largest measure of recall). At block 514, the method may further include the genetic rule generator adding the rule to the rule set, such as rule set 418 of FIG. 4. As illustrated, this portion of the method may also include the genetic rule generator removing from the reference data set, the duplicate item description entries that are found with the identified rule. In various embodiments, this may prevent rules that are found during subsequent iterations of the method from overlapping in scope with the current rule.

At block 516, the method may include the genetic rule generator determining whether more rules are to be found. For instance, this may include determining whether overall recall for the generated rule set has leveled off or reached a plateau. If this is not the case the method may proceed to block 500, at which point the genetic rule generator may generator another initial population in order to find a new rule. If the overall recall for the generated rule set has leveled off or reached a plateau, the genetic rule generator may determine that the rule set is complete.

Applying Machine Learning Models for Duplicate Detection and Other Objectives

In various embodiments, the rule set 418 generated by genetic rule generator 400 may be utilized by a duplicate detection engine 420, which may be implemented on a host system 422. In various embodiments, host system 422 may be a computer, such as the computer system of FIG. 10 described below. While genetic rule generator 400 and duplicate detection engine 420 are illustrated as separate components in FIG. 4, the functionality of these components may be integrated into a common component in some embodiments.

Duplicate detection engine 420 may be configured to apply one or more rules of rule set 418 to detect duplicate item description entries within item description entries 426 of item description data store 424. In various embodiments, duplicate detection engine 420 may also merge duplicate entries into single entries within data store 424. As described above, the presence of duplicates within item description information may have a number of implications. For instance, the presence of duplicate item description entries could result in the creation of two or more item detail pages for the same item. For example, these item detail pages may be served by a network portal 430 of host system 428 to one or more remote clients. Also described above, in some cases, the presence of duplicates may cause unintended partitioning of inventory records. Embodiments may avoid these situations by detecting and merging duplicate entries as described herein.

As described above, in various embodiments, reference item description entries 406 may be a sample (e.g., a subset) of the larger collection of item description entries 426. As such, the quality of this sample may in various embodiments affect the quality and/or performance of rule set 418. For instance, quality of the sample may refer to the degree to which reference item description entries 406 are representative of the larger collection of item description entries 426. One manner in which this may be determined may include a comparison of the precision and/or recall for the rule set when applied to a test sample of entries from item description entries 426. For instance, this test sample may be randomly selected from item description entries 426 in various embodiments. If the precision and/or recall of the rule set vary by a specified quantity across the test set and the reference set, the reference item description information may be updated to be more representative of item description entries 426. For example, if the rule set yields 100% precision for entries 406 but only 95% precision for the test sample of entries, embodiments may update reference item description entries 406 by adding item description entries causing false positive or negatives into reference item description entries 306. In this way, reference item description entries 406 may be updated over time to ensure that it remains representative of item description entries 426.

In various embodiments, while genetic techniques are largely described herein as being utilized to identify generate a rule set for identifying duplicates within item description information, similar techniques may be utilized to achieve other objectives in various embodiments. In one example, instead of identifying duplicates, the genetic techniques described herein may be utilized to determine items that are similar but not exact duplicates. These types of items may be referred to herein as related items. In various embodiments, knowledge of related items may be utilized to provide item recommendations within an electronic market place, for example. For instance, network portal 430 described above may be configured to provide one or more recommendations to purchase related items that are related to a items in which a customer has shown interest, such as items in the customer's browsing history. In one example, a component or widget for indicating a given item's related items may be included within an item detail page for that given item. In this way, a user may quickly and easily locate related items when viewing item detail pages. In various embodiments, to generate a rule set for identifying related items, rule constraints 404 may be altered if necessary but may remain generally similar to those used for duplicate detection. For instance, one example constraint might specify that the "color" field from one item description entry cannot be compared to a "size" field of another item description entry as such a comparison may not yield useful results for determining relatedness. In various embodiments, to generate a rule set for identifying related items, reference item description entries 406 duplicate information 408, and non-duplicate information 410 may be updated for detected related items. For instance, instead of indicating duplicates, information 408 may instead specify pairs of item description entries that have been positively identified as related. Likewise, instead of indicating non-duplicates, information 410 may instead specify pairs of item description entries that have been positively identified as not related. In various embodiments, genetic rule generator 400 may utilize genetic techniques similar to those described above in order to evaluate this information to generate a rule set for identifying related items.

In various embodiments, similar techniques may be utilized to adapt the genetic rule generator for generating a rule set for identifying items that are not related. For instance, the inputs to the genetic rule generator may be inverted in order to create a rule set for identifying the absence of items within a product catalog, such as item description entries 426. In various embodiments, the rules may be utilized to create a tool for evaluating whether a given item is related to any items within the product catalog. Such a tool may, for example, be utilized by a merchant's buyer's agents to, before sourcing a given item to be added to the product catalog, ensure that items related to the given item are not already included within the product catalog. For instance, as merchants may not have unlimited resources to stock all items from all vendors or manufacturers, merchants may use such a tool to efficiently utilize existing resources to provide as diverse of a product offering as possible.

In other embodiments, the same reference data may be used but the fitness function utilized by genetic rule generator may be different, such as fitness functions tailored to different objectives. For instance, one of these objective may be the detection of duplicate information items (e.g., duplicate item description entries), as described herein. Another objective may include determining that items are related but not duplicates, which may be useful for generating advertisements or recommendations for related items, for example. In other example, a fitness function may be tailored for the objective of identifying unique items, or items that are unrelated. In yet another example, a fitness function may be tailored for the objective of identifying items of a common title set, which may include different products (e.g., physical books, audio books, electronic books, etc) that convey a common work of art (e.g., the same novel).

Other Machine Learning Models—Support Vector Machines

Figure 7:
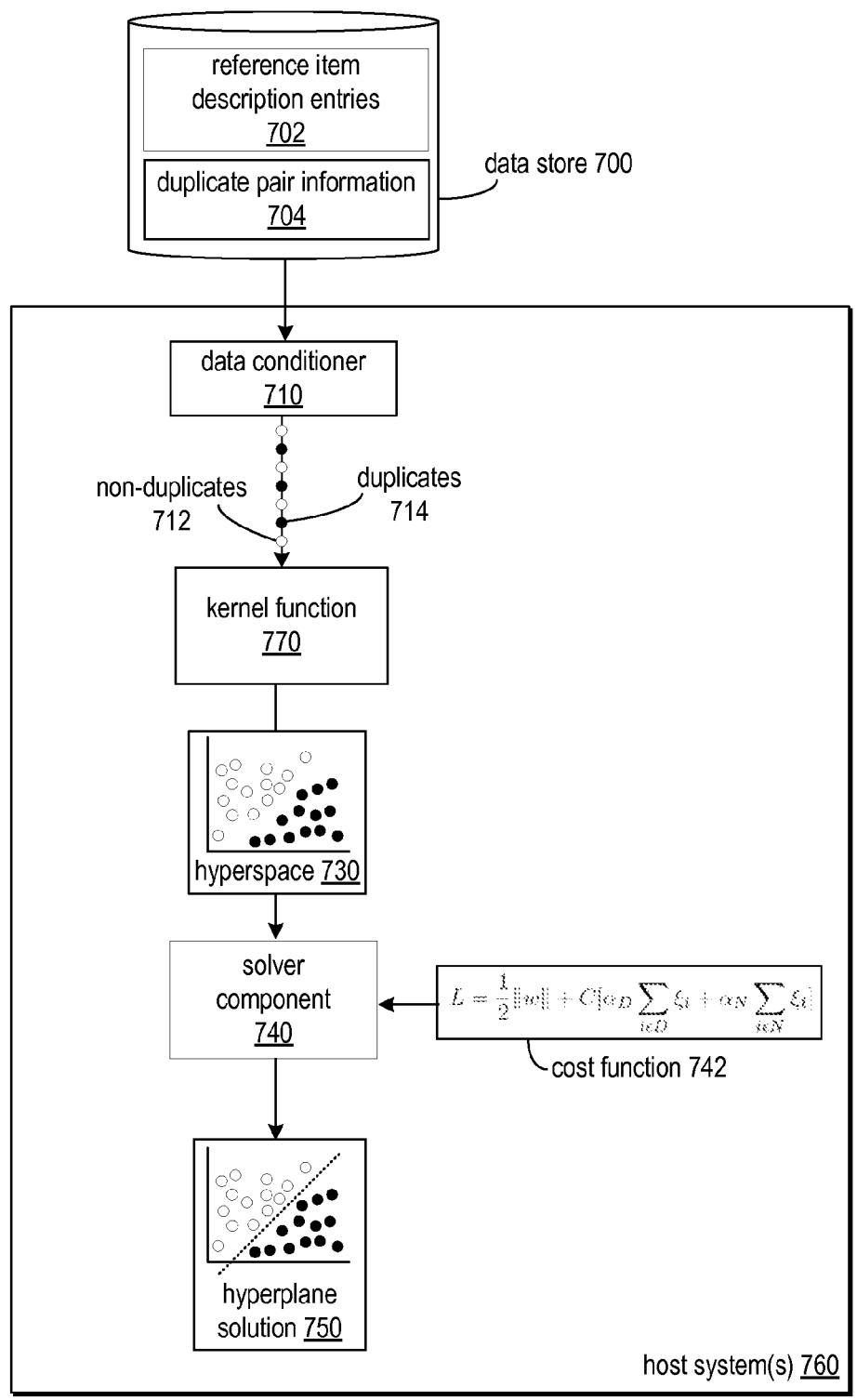
FIG. 7 illustrates a block diagram of the generation of a hyperplane solution for a support vector machine model, according to some embodiments.

FIG. 7 illustrates a block diagram of the elements used to generate a classification model using the principles of support vector machines, according to some embodiments. In the illustrated embodiment, a data store 700 may store reference item description entries 702. These item description entries may be based on item information, such as item description information 104 of FIG. 1. However, embodiments are not limited to entries that strictly describe items offered by a merchant. In general, entries may include information that describes anything including but not limited to items, people, places, things, patterns or any other type of information. Duplicate pair information 704 may specify which entries 702 are duplicates and which entries 702 are non-duplicates. Essentially, duplicate pair information 704 includes the requisite information for transitioning the one-dimensional collection of entries 702 to a two dimensional pair list including duplicate pairs and non-duplicate pairs.

Host system(s) 760 may include various components to generate a hyperplane solution that will serve as a component of the support vector machine classification model. In various embodiments, host system(s) 760 may be implemented as one or more computer systems, such as the computer system of FIG. 14 described below. The components illustrated within host system(s) 760 may be implemented as computer-executable instructions on such a computer system. Likewise, data structures and other information represented within host system(s) 760 may be stored within memory of such a computer system. In some cases, the data of data store 700 may also be stored within such memory.

Data conditioner component 700 may evaluate some or all of the information of data store 700 to generate multiple structured data items illustrated as known non-duplicates 712 and known duplicates 714. In various embodiments, each non-duplicate 712 may represent a pair of entries 702 that are non-duplicates (e.g., as specified by duplicate pair information 704). Likewise, each duplicate 714 may represent a pair of entries 702 that are duplicates (e.g., as specified by duplicate pair information 704). In various embodiments, entries 702 may be structured as a list of key value pairs and data conditioner 710 may perform an operation on corresponding values (e.g., values with common keys) to generate a corresponding result value that is represented in a structured data item of non-duplicates 712 or duplicates 714. In some embodiments, the structured data items described herein, including non-duplicates 712 and duplicates 714, may be structured as n-dimensional vectors where each component value of the vector represents the result of some comparison between an item description entry pair (either duplicate or non-duplicate).

In some embodiments, host system(s) 760 may have access to multiple rule conditions from a set of duplicate detection rules, which in some cases are generated using genetic techniques or other machine learning techniques. In this example, each rule condition may be used to evaluate one or more key-value attributes of an item description entry pair and the result of each rule condition may be stored in the corresponding vector component of one of the structured data items 712 and 714. In this case, if there are n rule conditions, the vectors that represent non-duplicates 712 and duplicates 714 may have dimension n. In various embodiments, the rule conditions describe above may be evaluated both symmetrically and asymmetrically. In some embodiments, symmetric evaluation requires that the attribute condition be met in both directions (from one item entry to another and vice versa) in order to be true whereas asymmetric evaluation does not have such requirement. In effect, depending on which type of evaluation is employed, different data sets of structured data items may result. In some cases, the data set 712 and 714 may include only items resulting from symmetric evaluation. In other cases, the data set may include only items resulting from asymmetric evaluation. In yet other cases, the data set may include a combination of these two data sets. Data conditioner 710 may generate any of these types of data sets.

In some embodiments, different data sets may also be formed based on how missing attributes are accounted for. For instance, in some embodiments, attributes of the structured data items 712 and 714 may be represented within an acceptable range defined as a monotonic scalar or in binary form (e.g., range is [0,1]). As noted above, the structured data items may have dimension n, but there may be no guaranteed that the item entries have n attributes. In some cases, item entries may have far less than n attributes. Embodiments may employ two primary options when accounting for these missing attributes. In one case, using an example acceptable range of [0, 1] the data conditioner 710 may populate these missing attributes with a small value within the bounds of the acceptable range (e.g., 0.1) or a value outside of the acceptable range (e.g., 2). In some embodiments, the two different approaches (e.g., inner vs. outer) may define two different types of data sets.

Consistent with the above variations (e.g., symmetric representation, asymmetric representation, combined symmetric and asymmetric, inner missing attribute representation, and outer missing attribute representation) and/or other variations not specified herein, there may exist many different data sets for which classification models may be generated. Additionally, in some embodiments, there may be multiple different kernel functions (described in more detail below with respect to kernel function 720) with which to process such data sets. The particular combination of which data set and which kernel function to utilize when generating a classification model according in accordance with SVMs may be determined according to a fitness function $f_D(A)$, which is defined below.

$$f_D(A) = \omega * \text{precision}(A,D) + (1-\omega)\text{recall}(A,D) \quad (1)$$

In the fitness function above, A may represent the particular algorithm being utilized (e.g., a particular kernel function) and D may represent the particular data set being evaluated. Different precision and recall functions may be utilized; for the purposes of identifying a dataset and kernel function to utilize, these function should remain be consistent across the evaluation. In some embodiments, the fitness function may be modified but generally adheres to the following requirements: the fitness is a function of both precision and recall, it is comparable across experiments with different algorithms while using the same dataset, and it specifies the trade-off between precision and recall. In example fitness function $f_D(A)$, this tradeoff is implemented by the $\omega$ variable. For instance, if a trade off precision to recall is desired in the ratio of 1:4, a $\omega$ value of 4/5 (or 0.8) may be utilized.

As described above, numerous variations (e.g., symmetric representation, asymmetric representation, combined symmetric and asymmetric, inner missing attribute representation, and outer missing attribute representation) are possible for the data set. In some embodiments, the data set may be chosen first before the kernel function by using a same test kernel function across the data sets (e.g., test the fitness of each data set with a liner kernel function). Once a particular data set is determined, the data set may be utilized across different kernel functions to identify the kernel function with the best fitness value in accordance with the fitness function. In general, any number of kernel functions and data sets may be evaluated in this manner. The remainder of this description is described within the context of a kernel function and data set already being isolated for use in accordance with these techniques (or some other technique for selecting a kernel function and dataset).

Kernel function 720 may map non-duplicates 712 and duplicates 714 into an n-dimensional hyperspace 730. For instance, as demonstrated above, non-duplicates 712 and duplicates 714 may be represented by n-dimensional vectors. However in some cases, kernel function 720 may map the non-duplicates 712 and the duplicates 714 into a hyperspace having a higher dimension n+x where x is a positive integer. This higher dimension hyperspace may in some cases be referred to as a feature space. Using a kernel function that maps n-dimensional duplicates and non-duplicates into a higher dimension feature space may in some cases be useful in order to find a relatively clean separation between the duplicates and the non-duplicates such that a suitable hyperplane solution may be solved for.

Solver component 740 may solve the hyperspace 730 for a hyperplane solution 750. In a mathematically ideal case, the solver component may solve for a hyperplane that cleanly separates the non-duplicates from the duplicates within the hyperspace. Furthermore, the solver component generally seeks to maximize the margin (or free space) between the hyperplane and the nearest-neighbor duplicates and non-duplicates. Generally, if the hyperspace (or feature space) 730 is n-dimensional, the hyperplane will be of n–1 dimension. For example, if the hyperspace is represented as three dimensional, they hyperplane may be a two dimensional plane. Likewise, a 100-dimensional hyperspace may be solved for a 99-dimensional hyperplane, and so on. In various embodiments, the solver may employ a variety of techniques to determine the hyperplane including but not limited to those employed by quadratic programming (QP) solvers. In some cases, a solution in which all duplicates are isolated on one side of the hyperplane and all non-duplicates are isolated on another side of the hyperplane may not be achieved. In these cases, solver component 750 may solve for a hyperplane that most cleanly separates the duplicates and non duplicates.

In various embodiments, solver component 740 may generate the hyperplane solution 750 based on a cost function 742. In some embodiments, this may involve minimizing the cost function. One example of a cost function is defined below.

$$L = \frac{1}{2}\|\omega\| + C\left[\alpha_D \sum_{i \in D} \xi_i + \alpha_N \sum_{i \in N} \xi_i\right] \quad (2)$$

In the cost function above, L may represent a cost value, ω may represent the vector normal to the hyperplane, $\|\omega\|$ may represent the norm of that vector, C may be a configurable constant, and ξ may represent a slack variable or function associated with a misclassification. As noted by D (e.g., the number of misclassified duplicates) and N (e.g., the number of misclassified non-duplicates) in the cost function, misclassifications of duplicates (i.e., false negatives) and misclassifications of non-duplicates (i.e., false positives) may be accounted for separately. In addition to accounting for false positives and false negatives separately, these values may also be weighted differently within the cost function, as noted by the distinct weighting factors $\alpha_D$ and $\alpha_N$. For instance, in one non-limiting example, $\alpha_N$ may be set to 10 times the value of $\alpha_D$. In this way, when solver component 240 solves for the hyperplane by minimizing the cost function, false positives may be penalized more heavily than false negatives. In various embodiments, when an ideal solution is not available (i.e., when some portion of the data resides on the "wrong" side of the hyperplane), the solver component may favor a hyperplane solution in which the misclassified data represents misclassified duplicates (i.e., false negatives) over misclassified non-duplicates (i.e., false positives).

Figure 8:
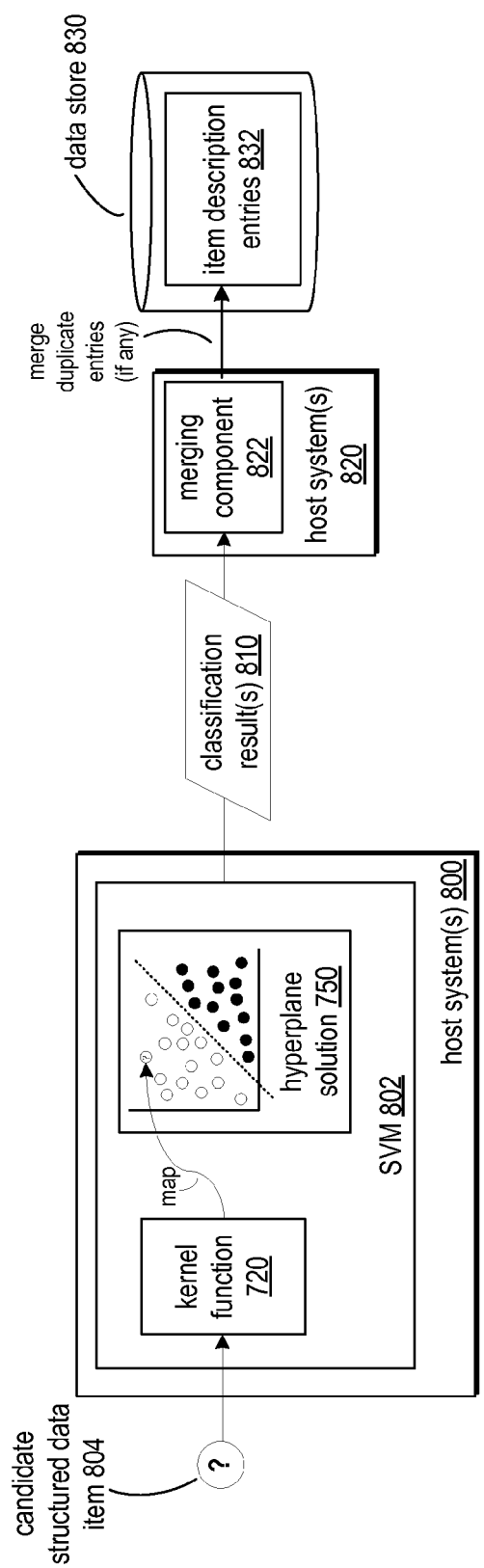
FIG. 8 illustrates a block diagram of the evaluation of a hyperplane solution for a support vector machine model, according to some embodiments.

In various embodiments, the collection of kernel function 720, hyperspace 730 and hyperplane solution 750 may form a support vector machine that may serve as a classification model that may be evaluated to classify newly considered structured data items, which may be referred to herein as candidates. FIG. 8 illustrates a block diagram including the evaluation of such a support vector machine serving as a classification model for classifying candidates as duplicates or non-duplicates.

In the illustrated embodiments, the classification model may be implemented as support vector machine 802 on one or more host systems 800. In various embodiments, host system(s) 800 may be implemented as one or more computer systems, such as the computer system of FIG. 14 described below. The components illustrated within host system(s) 800 may be implemented as computer-executable instructions on such a computer system. Likewise, data structures and other information represented within host system(s) 800 may be stored within memory of such a computer system. In some cases, the candidate structured data item may also be stored within such memory.

In the illustrated embodiment, SVM 802 may be configured to evaluate one or more candidate structured data items, such as candidate structured data item 804. The candidate may in various embodiments represent a duplicate or a non-duplicate and the SVM may perform various operations in order to generate a classification result 810 that indicates whether the candidate is classified as a duplicate or a non-duplicate.

To determine whether the candidate is to be classified as a duplicate or a non-duplicate, SVM 802 may evaluate the candidate 804 with kernel function 720 in order to map the candidate to a location within the hyperspace of hyperplane solution 750. In various embodiments, one portion of the hyperspace may be associated with a duplicate classification result and another portion of the hyperspace may be associated with a non-duplicate classification result. Generally, the duplicate portion resides on one side of the hyperplane and the non-duplicate portion resides on another side of the hyperplane solution. SVM 702 may be configured to determine in which of those portion the candidate resides (in accordance with the mapping performed by the kernel function). If the candidate resides in the duplicate portion, SVM 802 may generate classification result 810 such that the classification result indicates the candidate is a duplicate. If the candidate resides in the non-duplicate portion, SVM 802 may generate classification result 810 such that the classification result indicates the candidate is a non-duplicate.

In some embodiments, the classification result(s) 810 may be provided to a merging component 822 implemented on a host system 820, which may be a computer system, such as the computer system of FIG. 14 described below. In various embodiments, the merging component may be configured to determine whether the classification result indicates the candidate is a duplicate and, if so, generate an instruction or other indication to merge the corresponding pair of item description entries within data store 830. In various embodiments, these item description entries 832 may serve as the information from which item detail pages 112 (FIG. 1) are generated. As such, merging duplicates within data store 830 may propagate to the item detail pages and solve the fragmentation of item detail pages for the same item. Similarly, by penalizing false positives using the cost function described above, the chance of mistakenly merging the item description entries (and corresponding item detail pages) is minimized. Nevertheless, in some cases where perfect precision cannot be guaranteed (e.g., when at least some non-duplicates map to the "duplicate" side of the hyperplane), one or more human agents may review and confirm the classification results prior to merging.

Other Machine Learning Models—Boosted Decision Trees

Figure 9:
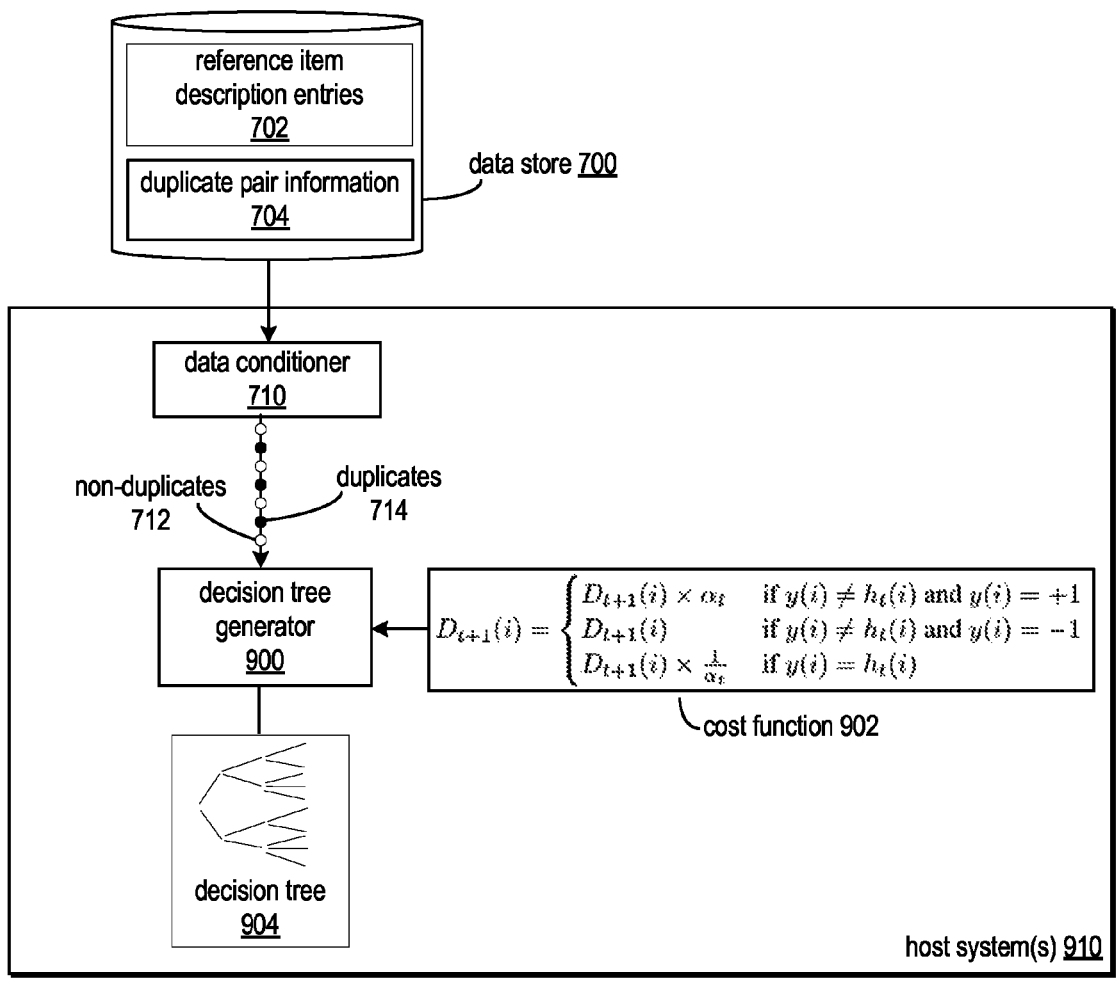
FIG. 9 illustrates a block diagram of the generation of a solution for a decision tree model, according to some embodiments.

FIG. 9 illustrates a block diagram of the elements used to generate a classification model using the principles of boosted decision trees (BDTs), according to some embodiments. In the illustrated embodiment, similar to FIG. 7, a data store 700 may store reference item description entries 702 described above. These item description entries may be based on item information, such as item description information 104 of FIG. 1. However, embodiments are not limited to entries that strictly describe items offered by a merchant. In general, entries may include information that describes anything including but not limited to items, people, places, things, patterns or any other type of information. As is the case in FIG. 7, duplicate pair information 704 may specify which entries 702 are duplicates and which entries 702 are non-duplicates. Essentially, duplicate pair information 704 includes the requisite information for transitioning the one-dimensional collection of entries 702 to a two dimensional pair list including duplicate pairs and non-duplicate pairs.

Host system(s) 910 may include various components to generate a decision tree that will serve as a component of the decision tree classification model. In various embodiments, host system(s) 910 may be implemented as one or more computer systems, such as the computer system of FIG. 14 described below. The components illustrated within host system(s) 910 may be implemented as computer-executable instructions on such a computer system. Likewise, data structures and other information represented within host system(s) 910 may be stored within memory of such a computer system. In some cases, the data of data store 700 may also be stored within such memory.

In various embodiments, data conditioner 710 may perform in a manner similar to that described above with respect to FIG. 7 in order to generate known non-duplicates 712 and known duplicates 714. Decision tree generator 900 may be configured to evaluate non-duplicate 212 and known duplicates 714 to generate a decision tree 904. As described below with respect to FIG. 10, this decision tree may be evaluated to classify candidate structured data items as duplicates or non-duplicates. In various embodiments, decision tree generator may utilize adaptive boosting and an associated cost function 902 to generate the decision tree. In various embodiments, adaptive boosting may include an iterative algorithm that trains a weak learner (e.g., decision trees) with respect to a probability distribution maintained over training examples. At each iteration, the probability distribution may penalize the misclassified data points such that the subsequent classifier (i.e., the decision tree) that is generated concentrates more on these penalized data points. In various embodiments, a cost function 902 that penalize false positive and false negatives differently within the adaptive boosting algorithm. In various embodiments, this cost function may cause the distribution of weights $D_t$ within the distribution at iteration t to be structured such that the distribution is biased towards false positive over false negatives. One example of such a cost function is specified below.

$$D_{t+1}(i) = \begin{cases} D_{t+1}(i) \times \alpha_t & \text{if } y(i) \neq h_t(i) \text{ and } y(i) = +1 \\ D_{t+1}(i) & \text{if } y(i) \neq h_t(i) \text{ and } y(i) = -1 \\ D_{t+1}(i) \times \dfrac{1}{\alpha_t} & \text{if } y(i) = h_t(i) \end{cases} \quad (3)$$

In the cost function above, $D_t(i)$ may represent the point probability of data point I with respect to the distribution D in iteration t. Furthermore, $\alpha_t$ may be a function of the error rate of the classifier in iteration t where $\alpha_t \epsilon (0, \infty)$. In various embodiments, y(i) may represent the true label (e.g., duplicate or non-duplicate) of data point i. In various embodiments, $h_t(i)$ may be the label predicted by the classifier (i.e., the current decision tree at time t) in iteration t for data point i. Note that the example cost function provides a three-tier weighting in which false positives are weighted or penalized the most heavily (e.g., by $\alpha_t$), false negatives are weighted or penalized less than false positives but more than correctly classified data points (although in the illustrated example, this weighting is an implicit weight of 1), and correctly classified data points are diminished or "rewarded" by a factor less than 1 (e.g., by $1/\alpha_t$). In other embodiments, other weighting schemes may be utilized to penalize false positives more heavily than false negatives.

Figure 10:
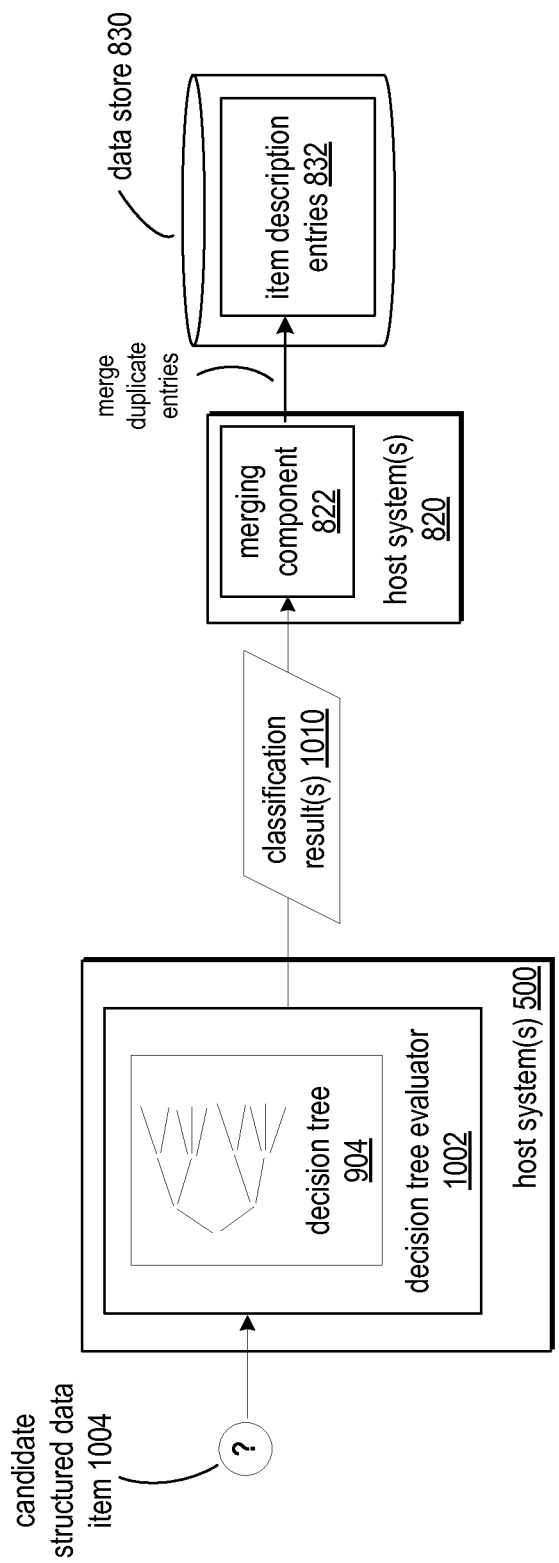
FIG. 10 illustrates a block diagram of the evaluation of a decision tree model, according to some embodiments.

In various embodiments, the collection of decision tree 904 and a decision tree evaluator 1002 (FIG. 10) may form a classification model that may be evaluated to classify newly considered structured data items, which may be referred to herein as candidates. FIG. 10 illustrates a block diagram including the evaluation of such a classification model for classifying candidates as duplicates or non-duplicates.

In the illustrated embodiments, the classification model may be implemented as a decision tree evaluator 1002 on one or more host systems 1000. In various embodiments, host system(s) 1000 may be implemented as one or more computer systems, such as the computer system of FIG. 14 described below. The components illustrated within host system(s) 1000 may be implemented as computer-executable instructions on such a computer system. Likewise, data structures and other information represented within host system(s) 1000 may be stored within memory of such a computer system. In some cases, the candidate structured data item may also be stored within such memory.

In the illustrated embodiment, decision tree evaluator 1002 may be configured to evaluate one or more candidate structured data items, such as candidate structured data item 1004. The candidate may in various embodiments represent a duplicate or a non-duplicate and the decision tree evaluator may perform various operations in order to generate a classification result 1010 that indicates whether the candidate is classified as a duplicate or a non-duplicate. To determine whether the candidate is to be classified as a duplicate or a non-duplicate, decision tree evaluator 1002 may evaluate the candidate 1004 with decision tree 904 in order to determine which label, duplicate or non-duplicate, applies to the candidate. If the result of the decision tree evaluation indicates the candidate is a duplicate, decision tree evaluator 1002 may generate classification result 1010 such that the classification result indicates the candidate is a duplicate. If the result of the decision tree evaluation indicates the candidate is a non-duplicate, decision tree evaluator 1002 may generate classification result 1010 such that the classification result indicates the candidate is a non-duplicate.

In some embodiments, the classification result(s) 1010 may be provided to a merging component 822 implemented on a host system 820, which may be a computer system, such as the computer system of FIG. 14 described below. As describe above with respect to FIG. 8, this merging component may be configured to determine whether the classification result indicates the candidate is a duplicate and, if so, generate an instruction or other indication to merge the corresponding pair of item description entries within data store 830. In various embodiments, these item description entries 332 may serve as the information from which item detail pages 112 (FIG. 1) are generated. As such, merging duplicates within data store 830 may propagate to the item detail pages and solve the fragmentation of item detail pages for the same item. Similarly, by penalizing false positives using the cost function described above, the chance of mistakenly merging the item description entries (and corresponding item detail pages) is minimized. Nevertheless, in some cases where perfect precision cannot be guaranteed, one or more human agents may review and confirm the classification results prior to merging.

Identifying and Correcting Marginal False Positives

As described above, the machine learning models described herein may utilize a variety of machine learning technique including but not limited to GA techniques, boosted decision trees, and support vector, such as those described above. In various embodiments, a machine learning model may generally include a collection of rules generated by these machine learning techniques, although such models are not limited to including such rules. Various embodiments may be configured to identify false positives within a given machine learning model. For instance, a false positive may be detected when a reference data set indicates that a pair of item description entries are not duplicates while a machine learning model (e.g., a GA rule set) indicates that such pair is a duplicate pair. In this example, the cause of the false positive may include, e.g., a deficiency of the model or a deficiency of the reference data set (e.g., a duplicate pair of item description entries mislabeled as a non-duplicate). Generally, the likelihood that the false positive is caused by a deficiency in the reference data set is directly related to the quantity of times a false positive is detected for a given pair of item description entries. For instance, consider a case where multiple generations of rules are created according to a GA analysis (such as the GA techniques described below). As a rule set evolves over time, item description pairs that were once identified as false positives may be correctly identified. However, there may be at least some pairs of item description entries that continue to be identified as false positives throughout the evolution of the rule set. As noted above, these pairs of item description entries may be referred to herein as marginal false positives.

Various embodiments may utilize techniques for distinguishing marginal false positives from other false positives as well as correcting these marginal false positives within data sets that are used to train the machine learning models described herein, such as the reference data sets described herein. In some cases, marginal false positives may be detected during or after generation of a particular machine learning model. The training data (e.g., reference item description entries) may be corrected in order to prevent the marginal false positives from reoccurring. After correction, that machine learning model may be regenerated based on the corrected training data in order to increase the performance of the model (e.g., as measured by precision and/or recall of the model). In many cases, an even larger performance boost may be realized by applying this technique to two different machine learning models, such as described below in regard to FIG. 11.

Figure 11:
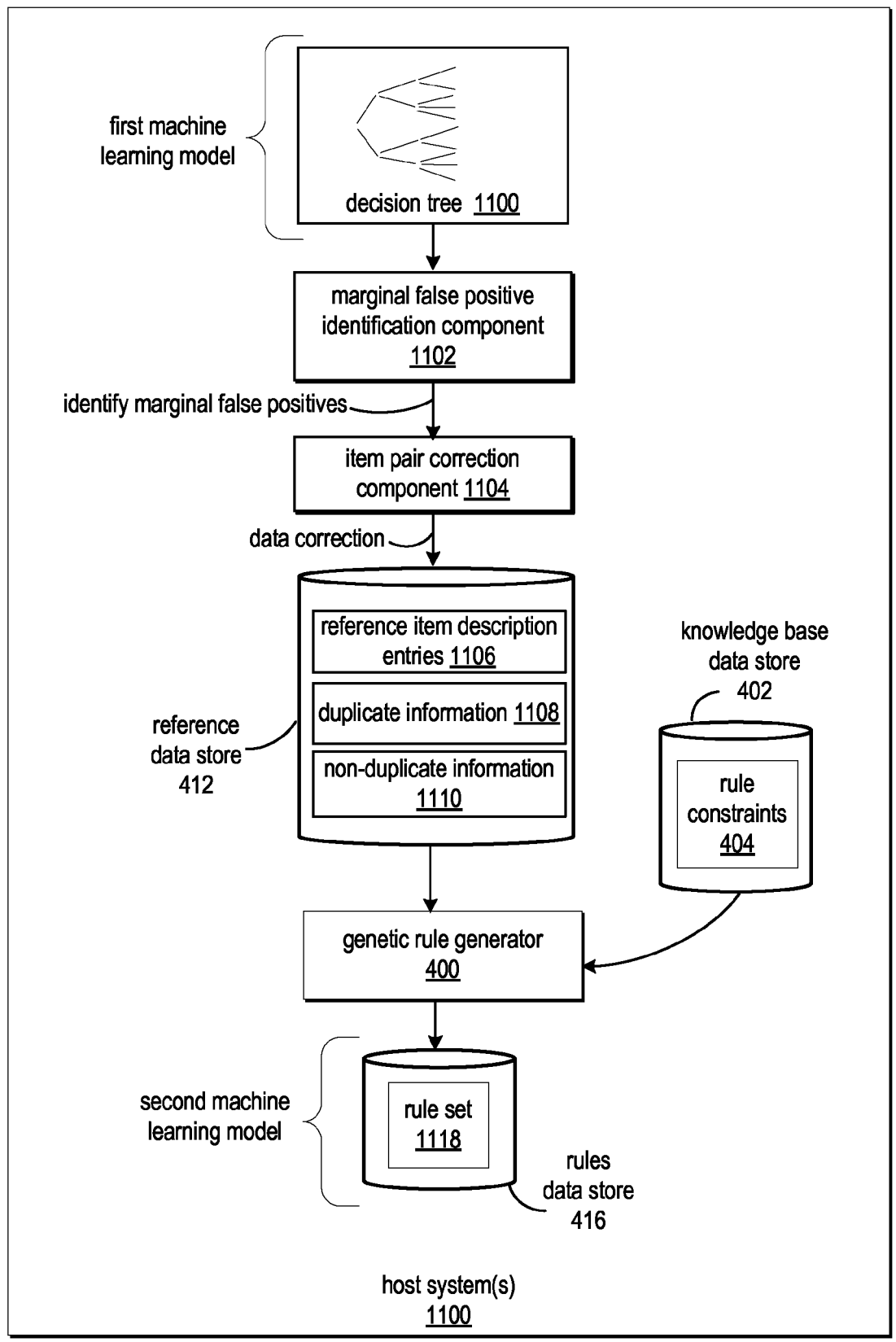
FIG. 11 illustrates a block diagram of a system for using different machine learning models to improve performance by detecting and reducing or eliminating marginal false positives, according to some embodiments.

FIG. 11 illustrates a block diagram of a system configured to reduce marginal false positives by utilizing two different machine learning models. In the illustrated embodiment, one or more host systems 1100 may be configured to implement the illustrated component as well as generate the illustrated data and information. In various embodiments, one or more of such host systems may include a computer system similar to that of FIG. 14 described below. In the illustrated embodiment, a first machine learning model may be generated according to any of the techniques described herein. In this particular embodiment, the techniques described above are utilized to generate a decision tree 1100, which may be similar to decision tree 904 described above. Generally, decision tree 1100 itself may be considered to be the generated machine learning model although in other cases other data and/or information may also be incorporated into the model. In various embodiments, decision tree 1100 may be a boosted decision tree similar to those described above in which different weights are assigned to different pairs of information items that need to be incorporated into the model. Generally, the more instances in which a pair of item description entries (or "item pair") is recognized as a false positive, the larger the weight that will be assigned to that item pair. In various embodiments, marginal false positive identification component 1102 may be configured to utilize the distribution weights of the boosted decision tree to identify marginal false positives within a training data set (e.g., a set of reference item description entries, such as item 702 described above or the illustrated reference item description entries 1106) that is used to generate the boosted decision tree. For instance, in one embodiment, marginal false positive identification component 1102 may determine that each item pair having a distribution weight greater than a specified threshold weight is a marginal false positive pair. In other cases, marginal false positive identification component 1102 may utilize other techniques for identifying marginal false positive pairs, such as ranking the item pairs by distribution weight and designating the n-most pairs of that ranking as marginal false positives.

Marginal false positive identification component 1102 may be configured to provide item pair correction component 1104 with information that identifies the marginal false positives. Item pair correction component 1104 may utilize this information to correct the training data from which the first machine learning model (e.g., decision tree 1100) was generated. This correction may be performed by correcting item pair labels within reference data store 412. In some embodiments, item pair correction component 1104 may re-label a pair of item description entries within data store 412. For instance, a pair may be re-labeled from being a non-duplicate to a duplicate or vice versa. In other cases, the correction may be performed by removing difficult types of items from the training data (e.g., from reference item description entries 1106). For instance, the differences between certain types of items may be too subtle to accurately handle within the machine learning models. In one non-limiting example, similar one-of-a-kind items may erroneously be labeled as duplicates within the training data and this may decrease the accuracy of the machine learning models generated. One example includes autographed items. Two autographed shirts may appear as duplicates based on the reference item description entries when in fact such autographed shirts may different significantly by attributes that are not taken into consideration when building the machine learning models (e.g., autograph legibility, thickness, placement etc.). In these instances, item pair correction component 1104 may correct the training data by removing these types of items from the training data or by incorporating the additional attributes within the training data. In some cases, these additional attributes may be readily available (e.g., hidden within a title attribute of an item description entry) and can quickly be added to training data once located. In other cases, acquiring these additional attributes may include requesting this information from suppliers, such as by requesting additional information similar to item description information 104 of FIG. 1.

In various embodiments, item pair correction component 1104 may be configured to autonomously determine which of the above-described corrections to perform. In other cases, the item pair correction component may interface with a human auditor that reviews marginal false positives and recommends the desired technique for correcting the training data (e.g., the data of reference data store 412). Irrespective of whether item pair correction component 1104 utilizes the assistance of a human auditor, the item pair correction component 1104 may issue one or more commands to reference data store 412 in order to correct reference item description entries 1106 and/or the associated labels (e.g., duplicate, non-duplicate) specified by duplicate information 1108 and non-duplicate information 1110.

After the training data has been updated to mitigate marginal false positives as described above, genetic rule generator 400 may utilize any of the GA techniques described above to generate a new machine learning model, which in the illustrated embodiments is presented as a rule set 1118, based on the corrected training data of reference data store 412. In the non-limiting illustrated embodiment, marginal false positives are detected with one type of machine learning model (e.g., a boosted decision tree), the training data is corrected to mitigate at least some of those marginal false positives, and then a second machine learning model (a rule-based GA model) is generated based on the corrected training data. As different models may yield different sets or "views" of marginal false positives, using two different types of machine learning models in this way may identify and correct at least some marginal false positives that might otherwise go undetected. These techniques, by eliminating a significant quantity of marginal false positives, may significantly improve the performance (e.g., precision and/or recall) of a given machine learning model in regard to duplicate detection and the other objectives described herein (e.g., identifying related items, unique items, items of a common title set, etc.).

Note that embodiments are not limited to the particular machine learning models illustrated in FIG. 11. For instance, in one embodiment, the first machine learning model may instead be a support vector machine including a hyperplane solution for classifying items pairs (e.g., classifying item pairs as duplicates or non-duplicates). In this example, instead of using boosted decision tree weights, marginal false positive identification component may instead identify item pairs based on the slack variables (see e.g., the cost function of hyperplane solution 750 described above) (e.g., a minimum threshold slack variable may be utilized), distance from the margin in the hyperplane solution, and/or a count of instances in which an item pair is implicated in a false positive detection.

In some embodiments, the first machine learning model and the second machine learning model that is generated based on the corrected training data need not be different types of machine learning models. For instance, instead of boosted decision tree, the first machine learning model of FIG. 11 may instead be a GA derived rule set (as is the case for rule set 1118). Even in cases where the same type of machine learning model is used for both the old and new machine learning models, embodiments may significantly mitigate the quantity of false positives and thus increase the performance of the final machine learning model (e.g., performance as measure in precision or recall).

In cases where the first machine learning model is implemented as a GA derived rule set, embodiments may utilize count values that, for each item pair, indicates the quantity of instances in which that item pair was identified as a false positive during the evaluation of the rule set. These count values may be initialized and updated through the GA rule set generation process in various embodiments. Generally, items that are more frequently identified as false positives during the evolution of a GA rule set are more likely to be designated as marginal false positives mandating an update to the training data. In some embodiments, marginal false positive identification component may enforce a threshold count value on the item pairs and designate item pairs having a count value above the threshold as marginal false positives.

Example Methods

Figure 12:
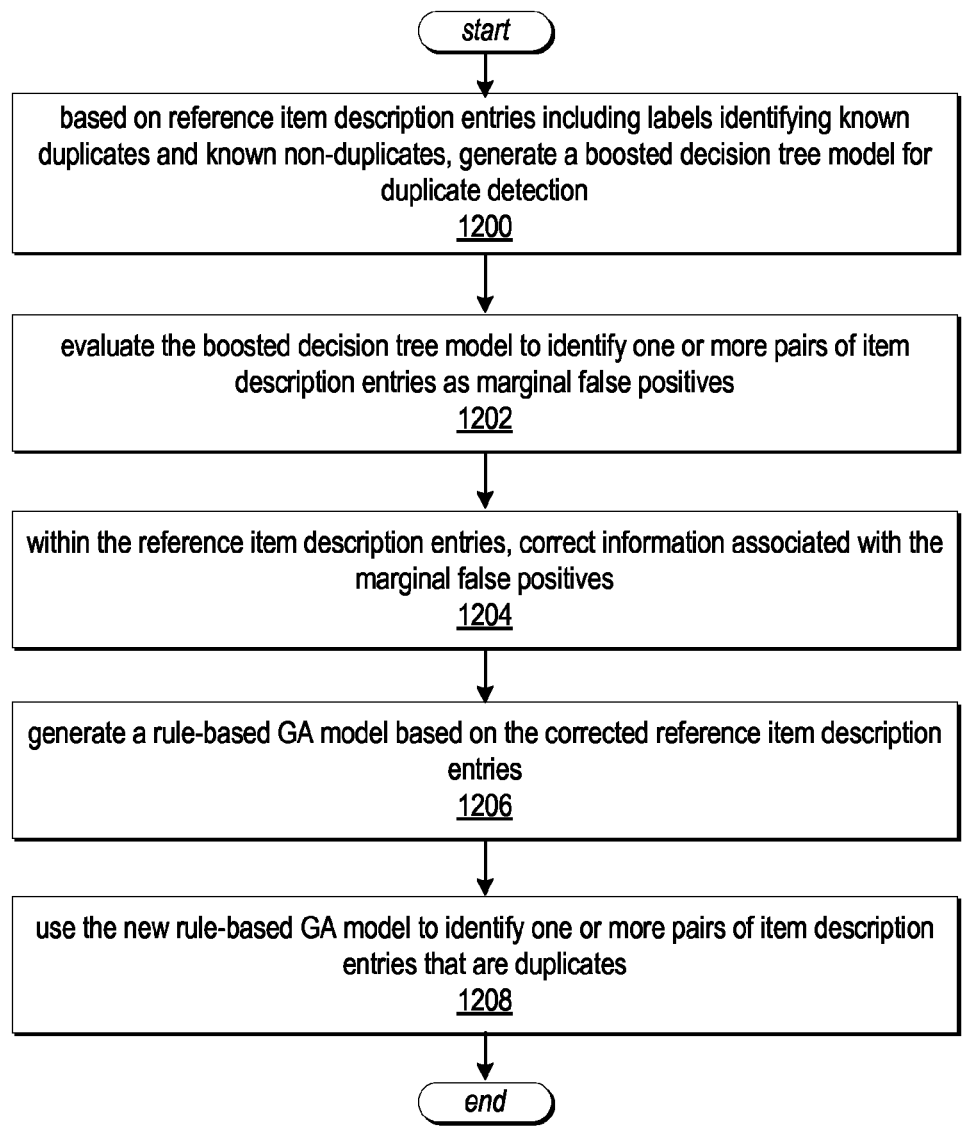
FIG. 12 illustrates a flowchart of an example method for using different machine learning models to improve performance by detecting and reducing or eliminating marginal false positives, according to some embodiments.

FIG. 12 illustrates a flowchart of an example method for using the techniques described herein to mitigate marginal false positives and improve the performance of duplicate detection models. In various embodiments, the illustrated method may be performed by a computer system, such as the computer system of FIG. 14 described below. As illustrated at block 1200, the method may include, based on reference item description entries including labels identifying known duplicates and known non-duplicates (e.g., any of the reference item description entries described above), generating a boosted decision tree model for duplicate detection. For instance, this portion of the method may include using any of the techniques described above in order to generate a boosted decision tree configured to classify a pair of item description entries as a duplicate or non-duplicate.

As illustrated at block 1202, the method may include evaluating the boosted decision tree model to identify one or more pairs of item description entries as marginal false positives. Generally, the more instances in which a pair of item description entries (or "item pair") is recognized as a false positive, the larger the corresponding distribution weight that will be assigned to that item pair within the boosted decision tree. In various embodiments, this portion of the method may include utilizing the distribution weights of the boosted decision tree to identify marginal false positives within a training data set (e.g., a set of reference item description entries, such as item 702 described above or the illustrated reference item description entries 1106) that is used to generate the boosted decision tree. For instance, in one embodiment, the method may include determining that each item pair having a distribution weight greater than a specified threshold weight is a marginal false positive pair. In other cases, the method may include utilizing other techniques for identifying marginal false positive pairs, such as ranking the item pairs by distribution weight and designating the n-most pairs of that ranking as marginal false positives.

As illustrated at block 1204, the method may include, within the reference item description entries, correct information associated with the marginal false positives. In various embodiments, these corrections may be performed by correcting duplicate/non-duplicate labels of the item description entries. For instance, in some embodiments, the method may include re-labeling a pair of item description entries from a non-duplicate to a duplicate or vice versa. In other cases, this portion of the method may include by removing difficult types of items from the training data (e.g., from reference item description entries 1106). For instance, the differences between certain types of items may be too subtle to accurately handle within the machine learning models. In one non-limiting example, similar one-of-a-kind items may erroneously be labeled as duplicates within the training data and this may decrease the accuracy of the machine learning models generated. One example includes the autographed items described above. In these instances, the method may include correcting the training data by removing these types of items from the training data or by incorporating the additional attributes within the training data. In some cases, these additional attributes may be readily available (e.g., hidden within a title attribute of an item description entry) and can quickly be added to training data once located. In other cases, the method may include acquiring these additional attributes from suppliers, such as by requesting additional information similar to item description information 104 of FIG. 1.

As illustrated at block 1206, the method may also include generating a rule-based GA model based on the corrected reference item description entries. For example, this portion of the method may include performing any of the GA technique described above (including, e.g., crossover and mutation operations) to generate a new rule set from the corrected reference item description entries. As illustrated at block 1208, the method may also include using the new rule-based GA model to identify one or more pairs of item description entries that are duplicates. For instance duplicate entries may be detected for merging and consolidating a catalog, such as described above with respect to FIG. 4.

Figure 13A:
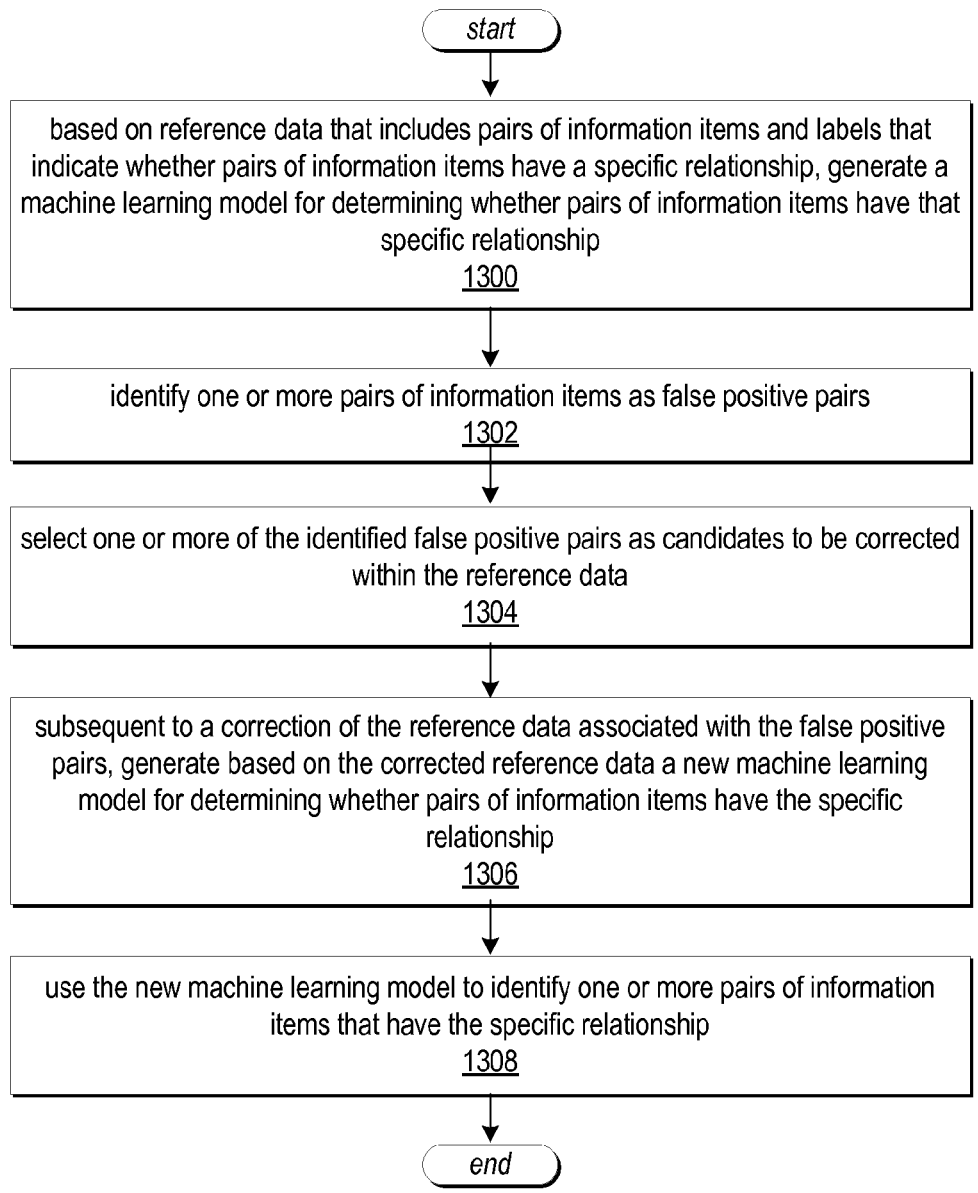
FIG. 13A illustrates a flowchart of an example method for using one or more machine learning models to improve performance by detecting and reducing or eliminating marginal false positives, according to some embodiments.

FIG. 13A illustrates a flowchart of another example method for using the techniques described herein to mitigate marginal false positives and improve the performance of duplicate detection models. In various embodiments, the illustrated method may be performed by a computer system, such as the computer system of FIG. 14 described below. As illustrated at block 1300, the method may include, based on reference data that includes pairs of information items and labels that indicate whether pairs of information items have a specific relationship, generate a machine learning model for determining whether pairs of information items have that specific relationship. In various embodiments, this specific relationship between information items may include but is not limited to a relationship indicating the information items are duplicates, related, different (e.g., unique), members of the same title set, and/or related in some other defined way. Furthermore, the machine learning model generated at block 1300 may include but is not limited to GA machine learning models, SVM models, and/or BDT models. The type of model utilized at block 1300 may be the same as or different than the model type utilized at block 1308 described below.

As illustrated at block 1302, the method may include identifying one or more pairs of information items as false positive pairs. For instance, a given false positive pair may be a pair of information items that the machine learning model (e.g., GA rule set, SVM, BDT, etc.) indicates as having the specific relationship but which also is labeled within the reference data as not having the specific relationship (e.g., a conflict between the model and training data). Multiple pairs of information items may be identified at block 1302 and subsequently evaluated at block 1304, which includes selecting one or more of these pairs as candidates to be corrected within the reference data. In various embodiments, this portion of the method may include applying a threshold to count values (GA rule set), to slack variables (SVM analysis), or distribution weights (BDTs), according to the techniques described in more detail above. In these cases, pairs of information items having values exceeding the threshold may be designated as marginal false positives or candidates to be corrected within the reference data.

As illustrated at block 1306, the method may also include, subsequent to a correction of the reference data associated with the false positive pairs (e.g., correction of reference item description 1106 and associated labels), generating based on the corrected reference data a new machine learning model for determining whether pairs of information items have the specific relationship. In various embodiments, the type of model utilized at block 1308 may be the same as or different than the model type utilized at block 1300 described above. In various embodiments, as different models may yield different sets or "views" of marginal false positives, using two different types of machine learning models may identify and correct at least some marginal false positives that might otherwise go undetected. These techniques, by eliminating a significant quantity of marginal false positives, may significantly improve the performance (e.g., precision and/or recall) of a given machine learning model in regard to duplicate detection and the other objectives described herein. As illustrated at block 1308, the method may also include using the new rule-based GA model to identify one or more pairs of item description entries that have the specific relationship. For instance duplicate entries may be detected for merging and consolidating a catalog, such as described above with respect to FIG. 4.

Figure 13B:
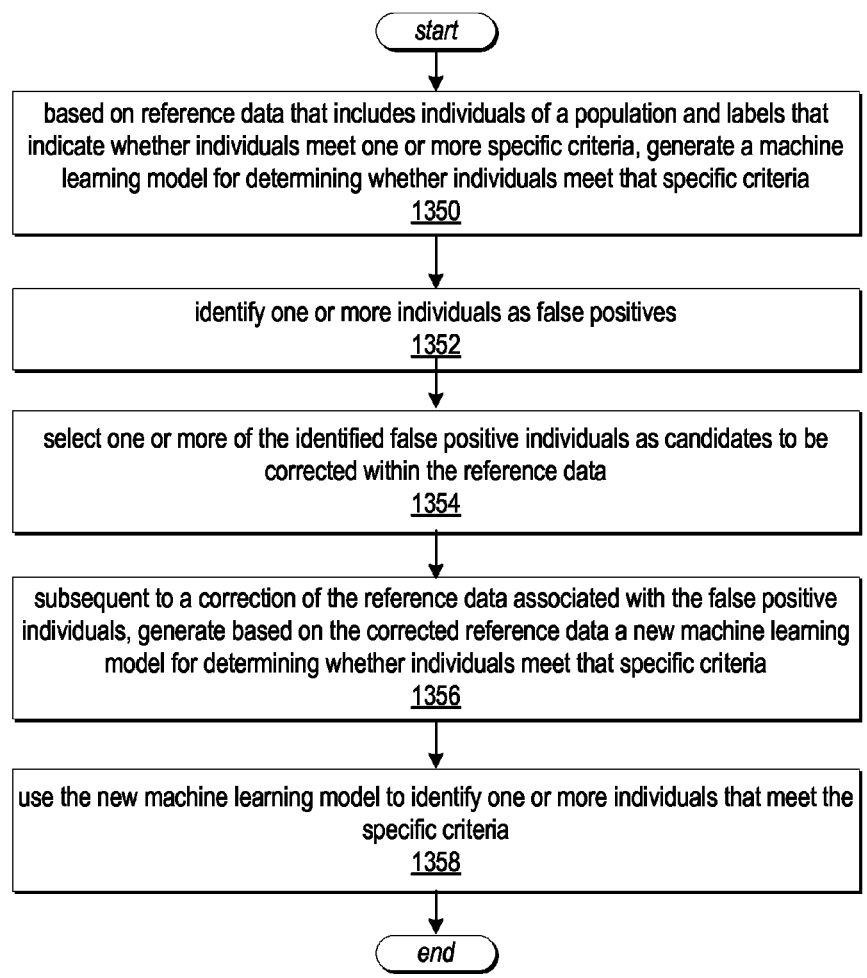
FIG. 13B illustrates a flowchart of another example method for using one or more machine learning models to improve performance by detecting and reducing or eliminating marginal false positives, according to some embodiments.

FIG. 13B illustrates a flowchart of another example method for using the techniques described herein to mitigate marginal false positives and improve the performance of machine learning models. In various embodiments, the illustrated method may be performed by a computer system, such as the computer system of FIG. 14 described below. Note that while various portions of the description presented herein refer analysis or actions performed on pairs of items (e.g., pairs of item description entries), any of the techniques described herein may also apply to any individual in a population. As illustrated at block 1350, the method may include, based on reference data that includes individuals of a population and labels that indicate whether individuals meet one or more specific criteria generate a machine learning model for determining whether individuals meet that specific criteria. In various embodiments, these specific criteria may include but are not limited to criteria defining the relationships described herein (e.g., relationships specifying whether items are duplicates, related, unique, etc.). Furthermore, the machine learning model generated at block 1350 may include but is not limited to GA machine learning models, SVM models, and/or BDT models. The type of model utilized at block 1350 may be the same as or different than the model type utilized at block 1358 described below. In various embodiments, other types of machine learning models may be utilized (at block 1350 and 1358) including but not limited to the random forest machine learning technique and the multiple additive regression trees (MART) technique.

As illustrated at block 1352, the method may include identifying one or more individuals as false positives. For instance, a given false positive may be an individual (e.g., a pair of information items) that the machine learning model (e.g., GA rule set, SVM, BDT, etc.) indicates as meeting the specific criteria (e.g., as having the specific relationship) but which also is labeled within the reference data as not meeting the criteria (e.g., as not having the specific relationship). For example a false positive may occur when there is a conflict between the model and training data. Multiple individuals may be identified at block 1352 and subsequently evaluated at block 1354, which includes selecting one or more of the individuals as candidates to be corrected within the reference data. In various embodiments, this portion of the method may include applying a threshold to count values (GA rule set), to slack variables (SVM analysis), or distribution weights (BDTs), according to the techniques described in more detail above. In these cases, individuals having values exceeding the threshold may be designated as marginal false positives or candidates to be corrected within the reference data.

As illustrated at block 1356, the method may also include, subsequent to a correction of the reference data associated with the false positive pairs (e.g., correction of reference item description 1156 and associated labels), generating based on the corrected reference data a new machine learning model for determining whether individuals meet the specific criteria. In various embodiments, the type of model utilized at block 1358 may be the same as or different than the model type utilized at block 1350 described above. In various embodiments, as different models may yield different sets or "views" of marginal false positives, using two different types of machine learning models may identify and correct at least some marginal false positives that might otherwise go undetected. These techniques, by eliminating a significant quantity of marginal false positives, may significantly improve the performance (e.g., precision and/or recall) of a given machine learning model in regard to duplicate detection and the other objectives described herein. As illustrated at block 1358, the method may also include using the new rule-based GA model to identify one or more individuals that meet the specific criteria (e.g., pairs that have the specific relationship). For instance duplicate entries may be detected for merging and consolidating a catalog, such as described above with respect to FIG. 4. Furthermore, while the techniques presented herein are largely described with respect to identification of false positives, these techniques may also be applied to false negatives, such as in cases where any lack of recall is undesirable.

Example Computer System

Various embodiments of the system and method for identifying and correcting marginal false positives in machine learning models, as described herein, may be executed on one or more computer systems, which may interact with various other devices. Note that any component, action, or functionality described above with respect to FIGS. 1-13 may be implemented on one or more computers configured as computer system 1400 of FIG. 14, according to various embodiments. In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, and display(s) 1480. In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store program instructions 1422 and/or data 1432 accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions 1422 may be configured to implement any functionality of the genetic rule generator 400, SVM 802, decision tree evaluator 1002 and any other component or system described above. Additionally, data 1432 of memory 1420 may store any of the information or data structures described above, including but not limited to rule constraints 404, reference item description entries 406, duplicate information 408, non-duplicate information 410, rule set 418, and/or data representing any of the machine learning models described herein (including but not limited to SVMs, BDTs, and GA rule sets). In some embodiments, program instructions and/or data may be received, sent or stored upon different types of computer-accessible media or on similar media separate from system memory 1420 or computer system 1400. While computer system 1400 is described as implementing the functionality of functional blocks of previous Figures, any of the functionality described herein may be implemented via such a computer system.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network 1485 or between nodes of computer system 1400. Network 1485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or accessing data by one or more computer systems 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

Figure 14:
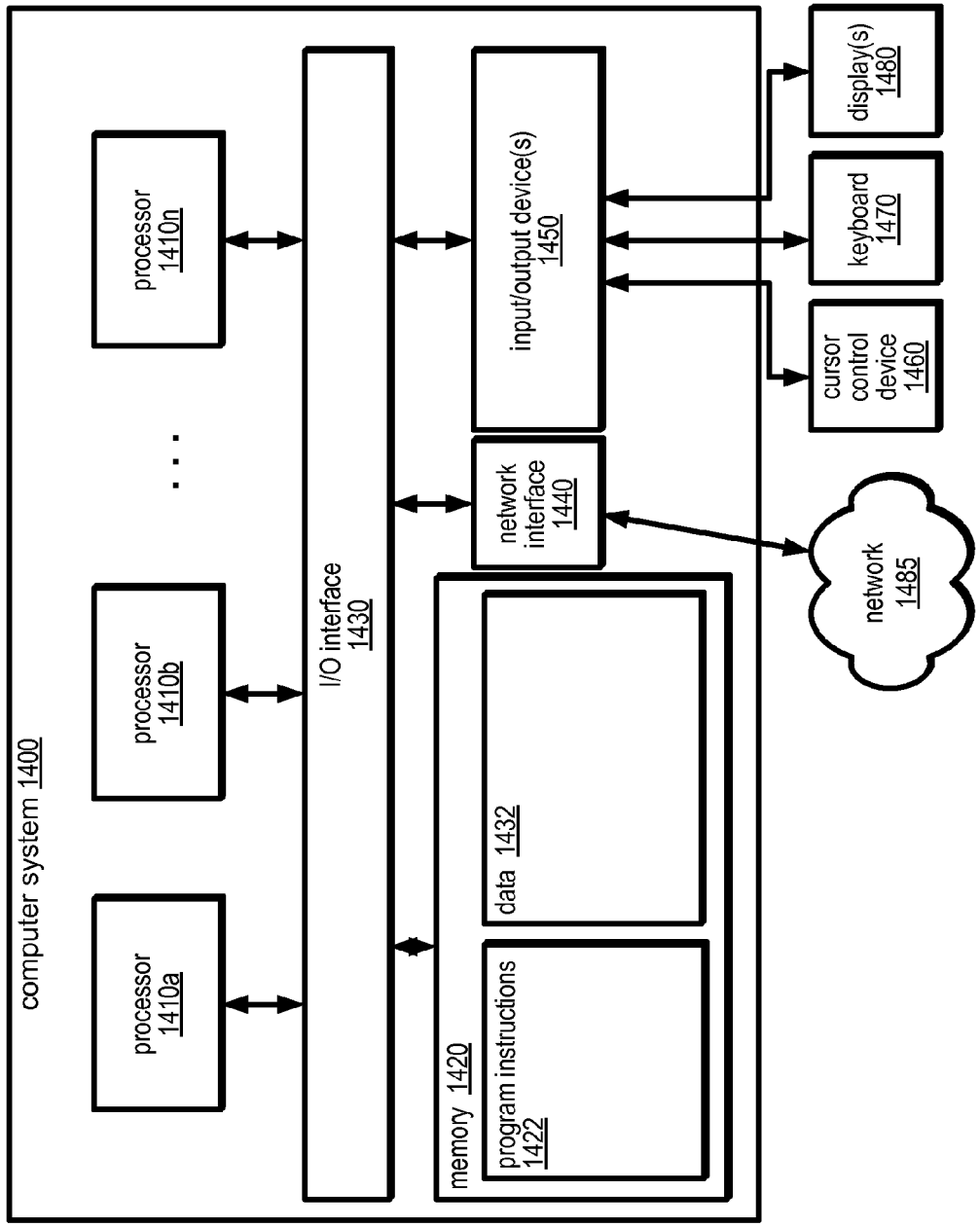
FIG. 14 illustrates one example of a computer system suitable for implementing various elements of the system and method for identifying and correcting marginal false positives in machine learning models, according to some embodiments.

As shown in FIG. 14, memory 1420 may include program instructions 1422, which may be processor-executable to implement any element or action described above. In one embodiment, the program instructions may implement the methods described above, such as the methods illustrated by FIGS. 12 and 13. In other embodiments, different elements and data may be included. Note that data 1432 may include any data or information described above.

Those skilled in the art will appreciate that computer system 1400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
based on reference data that includes pairs of item description entries and labels that each indicate whether a given pair of item description entries are duplicates, generating a first machine learning model for determining whether a given pair of information items is a duplicate pair; wherein a given duplicate pair represents different item description entries that describe a common item;
identifying one or more false positive pairs, wherein a given false positive pair is a pair of information items that the first machine learning model indicates as duplicates and which are labeled within the reference data as non-duplicates;
selecting one or more of the identified false positive pairs as candidates to be corrected within the reference data; and
subsequent to a correction of the reference data including at least one label of a selected false positive pair being modified to indicate that pair is a duplicate pair, generating based on the corrected reference data a new machine learning model for determining whether pairs of information items are duplicates.

2. The computer-implemented method of claim 1, wherein the method comprises using the new machine learning model to determine whether a pair of information items is a duplicate pair.

3. The computer-implemented method of claim 1, wherein one or more of the machine learning models include one or more of: a genetic algorithm (GA), a boosted decision tree (BDT) model, or a support vector machine (SVM) model.

4. The computer-implemented method of claim 1, wherein the first machine learning model and the new machine model are different types of machine learning models.

5. A computer-implemented method, comprising:
based on reference data that includes individuals of a population and labels that each indicate whether a given individual meets one or more specific criteria, generating a first machine learning model for determining whether individuals meet said specific criteria;
identifying one or more false positive individuals, wherein a given false positive individual is an individual that the first machine learning model indicates as having meeting said specific criteria and which is labeled within the reference data as not meeting said specific criteria;
selecting one or more of the identified false positive individuals as candidates to be corrected within the reference data; and subsequent to a correction of the reference data associated with one or more of the selected false positive individuals, generating based on the corrected reference data a new machine learning model for determining whether individuals meet said specific criteria.

6. The computer-implemented method of claim 5, wherein said correction includes one or more of:
a correction of one or more labels associated with one or more of the false positive individuals; or
removal of reference data associate with the one or more of the false positive individuals.

7. The computer-implemented method of claim 5, wherein said specific criteria define a specific relationship including one or more of:
a relationship indicating information items of an individual are duplicates, wherein a duplicate includes information items describing a common item;
a relationship indicating information items of a given individual are related but not duplicates;
a relationship indicating information items of a given individual are unrelated items; or
a relationship indicating information items of a given individual are members of a common title set, the title set including different products conveying a common work of art.

8. The computer-implemented method of claim 5, wherein the method comprises using the new machine learning model to determine whether an individual meets said specific criteria.

9. The computer-implemented method of claim 5, wherein one or more of the machine learning models include one or more of: a genetic algorithm (GA), a boosted decision tree (BDT) model, or a support vector machine (SVM) model.

10. The computer-implemented method of claim 5, wherein the first machine learning model and the new machine model are different types of machine learning models.

11. The computer-implemented method of claim 5, wherein the first machine learning model is a genetic algorithm (GA) model, wherein identifying one or more false positive individuals comprises determining that one or more rules of the genetic algorithm model identify an individual as meeting said specific criteria while the label of that individual indicates that individual does not meet said specific criteria.

12. The computer-implemented method of claim 11, wherein selecting one or more of the identified false positives as candidates to be corrected within the reference data comprises:
during the generation of the genetic algorithm model, creating count values for multiple false positive individuals and incrementing a given false positive individual's count value each time a rule of the genetic algorithm model incorrectly identifies that individual as a duplicate; and
selecting one or more false positive individuals as candidates to be corrected based on the count values.

13. The computer-implemented method of claim 5, wherein the first machine learning model is a boosted decision tree (BDT) model including weight values associated with different individuals, wherein the method comprises selecting one or more false positive individuals as candidates to be corrected based on the weight values.

14. The computer-implemented method of claim 5, wherein the first machine learning model is a support vector machine (SVM) model including slack variables associated with different individuals of information items mapped in a hyperspace, wherein the method comprises selecting one or more false positive individuals as candidates to be corrected based on the slack variables.

15. A system, comprising:
a memory; and
one or more processors coupled to the memory, wherein the memory comprises program instructions executable by the one or more processors to:
based on reference data that includes pairs of information items and labels that each indicate whether a given pair of information items have a specific relationship, generate a first machine learning model for determining whether pairs of information items have said specific relationship;
identify one or more false positive pairs, wherein a given false positive pair is a pair of information items that the first machine learning model indicates as having said specific relationship and which are labeled within the reference data as not having said specific relationship;
generate an indication of one or more of the identified false positive pairs as candidates to be corrected within the reference data.

16. The system of claim 15, wherein the program instructions are configured to, subsequent to a correction of the reference data including at least one label of a selected false positive pair being modified to indicate that the respective pair of information items have said specific relationship, generate based on the corrected reference data a new machine learning model for determining whether pairs of information items have said specific relationship.

17. The system of claim 15, wherein said specific relationship includes one or more of:
a relationship indicating the information items of a given pair are duplicates, wherein duplicate information items describe a common item;
a relationship indicating the information items of a given pair are related but not duplicates;
a relationship indicating the information items of a given pair are unrelated items; or
a relationship indicating the information items of a given pair are members of a common title set, the title set including different products conveying a common work of art.

18. The system of claim 15, wherein the program instructions are configured to use the new machine learning model to determine whether a pair of information items have said specific relationship.

19. The system of claim 15, wherein one or more of the machine learning models include one or more of: a genetic algorithm (GA), a boosted decision tree (BDT) model, or a support vector machine (SVM) model.

20. The system of claim 15, wherein the first machine learning model and the new machine model are different types of machine learning models.

21. The system of claim 15, wherein the first machine learning model is a genetic algorithm (GA) model, wherein identifying one or more false positive pairs comprises determining that one or more rules of the genetic algorithm model identify a pair of information items as having said specific relationship while the label of that pair indicates those information items do not having said specific relationship.

22. The system of claim 21, wherein selecting one or more of the identified false positives as candidates to be corrected within the reference data comprises:
during the generation of the genetic algorithm model, creating count values for multiple false positive pairs and incrementing a given false positive pair's count value each time a rule of the genetic algorithm model incorrectly identifies that pair as duplicate; and selecting one or more false positive pairs as candidates to be corrected based on the count values.

23. The system of claim 15, wherein the first machine learning model is a boosted decision tree (BDT) model including weight values associated with different pairs of information items, wherein the program instructions are configured to, based on the weight values, select one or more false positive pairs as candidates to be corrected.

24. The system of claim 15, wherein the first machine learning model is a support vector machine (SVM) model including slack variables associated with different pairs of information items mapped in a hyperspace, wherein the program instructions are configured to, based on the slack variables, select one or more false positive pairs as candidates to be corrected.

25. A computer-readable storage medium, storing program instructions computer-executable on a computer to implement a genetic rule generator configured to:

based on reference data that includes pairs of information items and labels that each indicate whether a given pair of information items have a specific relationship, generate a first machine learning model for determining whether pairs of information items have said specific relationship;

identify one or more false positive pairs, wherein a given false positive pair is a pair of information items that the first machine learning model indicates as having said specific relationship and which are labeled within the reference data as not having said specific relationship;

generate an indication of one or more of the identified false positive pairs as candidates to be corrected within the reference data.

26. The medium of claim 25, wherein the program instructions are configured to, subsequent to a correction of the reference data including at least one label of a selected false positive pair being modified to indicate that the respective pair of information items have said specific relationship, generate based on the corrected reference data a new machine learning model for determining whether pairs of information items have said specific relationship.

27. The medium of claim 25, wherein said specific relationship includes one or more of:

a relationship indicating the information items of a given pair are duplicates, wherein duplicate information items describe a common item;

a relationship indicating the information items of a given pair are related but not duplicates;

a relationship indicating the information items of a given pair are unrelated items; or a relationship indicating the information items of a given pair are members of a common title set, the title set including different products conveying a common work of art.

28. The medium of claim 25, wherein the program instructions are configured to use the new machine learning model to determine whether a pair of information items have said specific relationship.

29. The medium of claim 25, wherein one or more of the machine learning models include one or more of: a genetic algorithm (GA), a boosted decision tree (BDT) model, or a support vector machine (SVM) model.

30. The medium of claim 25, wherein the first machine learning model and the new machine model are different types of machine learning models.

31. The medium of claim 25, wherein the first machine learning model is a genetic algorithm (GA) model, wherein to identify one or more false positive pairs the program instructions are configured to determine that one or more rules of the genetic algorithm model identify a pair of information items as having said specific relationship while the label of that pair indicates those information items do not having said specific relationship.

32. The medium of claim 31, wherein to select one or more of the identified false positives as candidates to be corrected within the reference data, the program instructions are configured to:

during the generation of the genetic algorithm model, create count values for multiple false positive pairs and incrementing a given false positive pair's count value each time a rule of the genetic algorithm model incorrectly identifies that pair as duplicate; and select one or more false positive pairs as candidates to be corrected based on the count values.

33. The medium of claim 25, wherein the first machine learning model is a boosted decision tree (BDT) model including weight values associated with different pairs of information items, wherein the program instructions are configured to, based on the weight values, select one or more false positive pairs as candidates to be corrected.

34. The medium of claim 25, wherein the first machine learning model is a support vector machine (SVM) model including slack variables associated with different pairs of information items mapped in a hyperspace, wherein the program instructions are configured to, based on the slack variables, select one or more false positive pairs as candidates to be corrected.

* * * * *